United States Patent [19]
Kerstens et al.

[11] Patent Number: 5,877,858
[45] Date of Patent: Mar. 2, 1999

[54] TEXTURED SURFACE MONITORING AND CONTROL APPARATUS

[75] Inventors: Pieter J. M. Kerstens, Boca Raton; Huizong Lu, Coconut Creek; Hee Kuwon Park, Boynton Beach, all of Fla.

[73] Assignee: International Business Machines Corporation, Armonk, N.Y.

[21] Appl. No.: 932,447

[22] Filed: Sep. 19, 1997

[51] Int. Cl.⁶ .................................................... G01B 9/02
[52] U.S. Cl. ........................... 356/357; 356/359; 356/371
[58] Field of Search ..................................... 356/357, 371, 356/359, 360

[56] References Cited

U.S. PATENT DOCUMENTS

| | | | |
|---|---|---|---|
| 5,062,021 | 10/1991 | Ranjan et al. | 360/135 |
| 5,108,781 | 4/1992 | Ranjan et al. | 427/53.1 |
| 5,469,259 | 11/1995 | Golby et al. | 356/351 |
| 5,528,922 | 6/1996 | Baumgart et al. | 73/1 J |
| 5,539,213 | 7/1996 | Meeks et al. | 250/559.23 |
| 5,550,696 | 8/1996 | Mguyen | 360/135 |
| 5,557,399 | 9/1996 | De Groot | 356/357 |
| 5,586,040 | 12/1996 | Baumgart et al. | 364/474.08 |
| 5,595,791 | 1/1997 | Baumgart et al. | 427/554 |
| 5,658,475 | 8/1997 | Barenboim et al. | 219/121.77 |

*Primary Examiner*—Robert Kim
*Attorney, Agent, or Firm*—Richard A. Tomlin; Ronald V. Davidge

[57] ABSTRACT

Optical apparatus is provided for inspecting a textured surface measures a level of scattered reflections from the surface, occurring when an inspection laser beam is directed at the surface. In a first version of the apparatus, the intensity of scattered reflections directed at a single light-sensitive element are compared with the intensity of specular reflections directed at another light-sensitive element. In a second version, diffraction rings formed by the scattered reflections are passed through a mask which attenuates their intensity according to differences between the actual diffraction rings and a predetermined diffraction pattern. In a third version, the scattered light is divided by a beamsplitter to pass through one mask which increases attenuation as the diffraction rings are increased in size compared to a predetermined diffraction pattern or through another mask which decreases attenuation as the diffraction rings are decreased in size compared to the predetermined diffraction pattern.

7 Claims, 12 Drawing Sheets

TEXTURED SURFACE MONITORING AND CONTROL APPARATUS

CROSS-REFERENCE TO RELATED APPLICATIONS

Co-pending U.S. applications, Ser. No. 601,887, filed Feb. 15, 1996, and Ser. No. 457,559, filed Jun. 1, 1995, both entitled "Procedure Employing a Diode-Pumped Laser for Controllably Texturing a Disk Surface," by Peter M. Baumgart, et al., having a common assignee with the present invention, which are hereby incorporated by reference, describe a process for creating a "distant bump array" surface texture in a magnetic recording disk for reducing stiction, together with the disk so textured. The texturing process uses a tightly focused diode-pumped Nd:YLF or Nd:YVO$_4$ or other solid-state laser that is pulsed with a 0.3–90 nanosecond pulse train to produce a plurality of distantly-spaced bumps in the disk surface. The bump creation process is highly controllable, permitting repeated creation of a preselected bump profile, such as a smooth dimple or one with a central protrusion useful for low stiction without close spacing or elevated "roughness." Some bump profiles permit texturing of the data-storage region of the disk surface for low stiction without materially affecting magnetic data storage density.

Another co-pending U.S. application, Ser. No. 08/613,564, filed Mar. 11, 1996, entitled "Apparatus for Laser Texturing Disks," by Michael Barenboim, et al, having a common assignee with the present invention, which is hereby incorporated by reference, further describes a laser texturing station in which the optical apparatus of the present invention may be used.

Another co-pending U.S. application, Ser. No. 08/707,383, filed Sep. 4, 1996, entitled "Optical Apparatus for Dual Beam Laser Texturing," having a common assignee with the present invention, which is hereby incorporated by reference, describes a disk texturing system with a laser directed at a beamsplitter to split the laser beam into two beams having approximately equal power, which are directed along parallel paths through a power control optics block to expose simultaneously opposite sides of a disk to be textured. The power control optics block includes means for attenuating and measuring each of the two beams.

Another co-pending U.S. application, Docket No. 08/707,384, filed Sep. 4, 1996, entitled "Apparatus and Method for Controlling a Laser Texturing Tool," and having a common assignee with the present invention, which is hereby incorporated by reference, describes both electronic hardware and software used to control a laser texturing station in which the optical apparatus of the present invention may be used.

Another co-pending U.S. application, Ser. No. 08/707,385, filed Sep. 4, 1996, entitled "Controlling Pulses in a Laser Texturing Tool," and having a common assignee with the present invention, which is hereby incorporated by reference, describes a method for controlling the texturing laser used with the optical apparatus of the present invention to produce pulses having varying properties.

Another co-pending U.S. application, filed Sep. 5, 1996, Ser. No. 08/708,627, entitled "Method for Controlling Laser Power in a Texturing Process," and having a common assignee with the present invention, which is hereby incorporated by reference, describes a program for setting and maintaining the laser power levels in the optical apparatus of the present invention.

Another co-pending U.S. application, filed Sep. 23, 1996, Ser. No. 08/710,806, entitled "Optical Apparatus for Inspecting Laser Texture," and having a common assignee with the present invention, which is hereby incorporated by reference, describes the use of interferometric apparatus to determine the profile of textured spots. The interferometric apparatus can be mounted within a separate inspection tool or within the laser texturing tool.

Another co-pending U.S. application, filed Nov. 13, 1986, Ser. No. 748,642, entitled "Laser Texturing Apparatus with Dual Laser Paths Having an Independently Adjusted Parameter," and having a common assignee with the present invention, which is hereby incorporated by reference, describes a process for texturing two groups of disks on two separate spindles, with at least one parameter controlling the texturing process being controlled independently for disks being textured on each of the spindles.

Another co-pending U.S. application, filed Mar. 24, 1997, Ser. No. 08/823,273, entitled "Optical Apparatus for Monitoring Profiles of Textured Spots During a Disk Texturing Process," and having a common assignee with the present invention, which is hereby incorporated by reference, describes laser texturing apparatus in which the angle of reflection of an inspection beam directed at individual texture features following the texturing process provides an indication of the texture profile being attained. This angular motion of the reflected beam is used to provide feedback data controlling the texturing process.

BACKGROUND OF THE INVENTION

1. Field of the Invention

This invention relates to apparatus for fabricating a disk, such as a magnetic recording disk used in a computer hardfile, having surfaces textured by exposure to a pulsed laser, and, more particularly, to optical apparatus for determining profiles of texture features on such a disk by measuring scattered light reflected from the disk surface.

2. Background Information

Current hardfile drives use a Contact Start-Stop (CSS) system allowing a magnetic head, used to read and write data, to contact the surface of a magnetic disk in a specific CSS region when the disk is stationary. Thus, before the rotation of a spinning disk has stopped, the magnetic head is moved to the CSS region, where the magnetic head settles on the surface of the disk. When the disk again starts to rotate, the magnetic head slides along the disk surface in this region, until the laminar air flow at the disk surface, due to its rotation, fully lifts the magnetic head from the disk surface.

After the magnetic head is lifted in this way, it is moved from the CSS region to another region of the disk to read and write data. The CSS region is preferably textured to minimize physical contact between the magnetic head and the disk surface. In this way, the contact stick-slip phenomenon often called "stiction" and other frictional effects are minimized, along with the resulting wear of the magnetic head surface. Outside the CSS region the remainder of the disk surface preferably retains a specular smoothness to permit high-density magnetic data recording.

3. Description of the Prior Art

U.S. Pat. No. 5,062,021, to Ranjan et al., describes a process in which magnetic recording media are controllably textured, particularly over areas designated for contact with data transducing heads. In conjunction with rigid disk media, the process includes polishing an aluminum nickel-phosphorous substrate to a specular finish, then rotating the disk while directing pulsed laser energy over a limited portion of the radius, thus forming an annular head contact band while leaving the remainder of the surface specular. The band is formed of multiple individual laser spots, each with a center depression surrounded by a substantially circular raised rim. The depth of the depressions and the height of the rims are controlled primarily by laser power and firing pulse duration. The shape of individual laser spots can be altered by varying the laser beam inclination relative to the disk surface. On a larger scale, the frequency of firing the laser, in combination with disk rotational speed controls the pattern or arrangement of laser spots. The smooth, rounded contours of the depressions and surrounding rims, as compared to the acicular character of mechanical textured surfaces, is a primary factor contributing to substantially increased durability of laser textured media.

U.S. Pat. No. 5,539,213, to Meeks et al., describes an analyzing laser system which determines a physical characteristic of a repetitive texture pattern formed on a substrate surface. In one embodiment, the system used diffracted laser light to compute the average height of texturing bumps on a substrate surface. A laser beam is directed to the substrate surface and overlaps a group of individual marks or bumps formed in a repetitive pattern. A scanning linear photodetector array receives light diffracted from the surface. The digitized output of the array is the angular distribution of diffracted light intensities. In the preferred embodiment for determining the average height of laser-induced bumps formed on a specular magnetic recording disk substrate, the angular positions of the first and second diffraction peaks or rings are determined, and the intensities are integrated around these diffraction peaks or rings. These position and integrated intensity values are then compared to position and integrated intensity values for bumps of know height on calibration disk substrates. If the individual marks or bumps making up the repetitive pattern are also symmetrical, then the angular distribution of reflected light intensities is the square of the absolute value of the Fourier transform of the cross sectional profile of the bumps. Mathematical operations, including an inverse Fourier transform, are then performed on the digitized array output to yield the average cross sectional shape of the bumps illuminated by the analyzing laser.

What is needed is a method for examining the scattered light reflected from a textured surface in general, or a diffracted reflection of a laser beam from such a surface in particular without a need to perform complex calculations at a high speed.

SUMMARY OF THE INVENTION

It is therefore an objective of the present invention to provide apparatus in which scattered reflected light is focussed onto a single photosensitive element for analysis of a textured surface.

It is another objective of the present invention to provide apparatus in which an optical system is used to compare an actual diffraction ring pattern with a predetermined ideal diffraction ring pattern, eliminating a need to perform complex calculations at high speed.

In accordance with one aspect of the invention, there is provided optical apparatus for inspecting the texture of a surface. The optical apparatus includes an illumination source, separation means, a first scattered reflection sensor, and optical means. The illumination source aims a light beam at the surface. The separation means removes specular reflections of the light beam by the surface from scattered reflections of the light beam by the surface. The first scattered reflection sensor has a single light-sensitive element. The optical means integrates the scattered reflections, focussing them on the first scattered reflection sensor.

DETAILED DESCRIPTION

Figure 1:
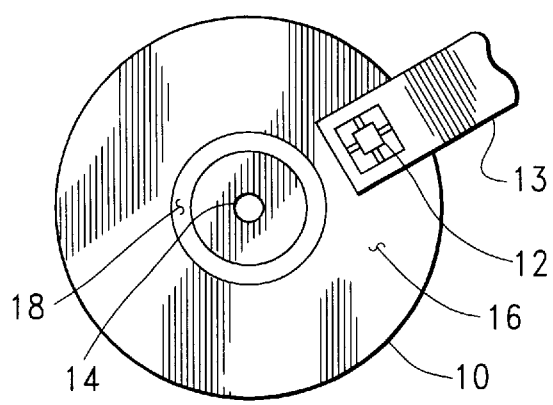
FIG. 1 is a plan view of an internal portion of a prior-art disk drive unit, including a rotatable magnetic disk having a textured annular region for CSS operation, and a magnetic head.

FIG. 1 is a plan view of a portion of a disk drive unit from the prior art for a computing system, including a rotatable magnetic storage disk 10, together with a magnetic head 12, which is driven in a generally radial direction relative to the disk 10 by means of a drive arm 13. This disk 10 is an example of the type of product which can be made using the apparatus of the present invention. When the disk drive unit is in operation, disk 10 is rotated about its central hole 14, forming a laminar flow of air holding magnetic head 12 slightly away from the adjacent disk surface 16. Before this rotation is stopped, magnetic head 12 is driven to be adjacent to a textured annular region 18 of the surface of disk 10. As this disk rotation slows and stops, the frictional and stiction effects occurring between the surface of annular region 18 and the adjacent contacting surface of magnetic head 12 are minimized by the textured nature of the surface of this region 18. Subsequently, when the rotation of disk 10 is restarted, these effects are again minimized, as the rate of rotation of disk 10 increases until the laminar flow of air near its surface lifts the adjacent surface of magnetic head 12 completely away from the disk surface. Thus, as the rotation of disk 10 is stopped and subsequently restarted, the wear of the surface of magnetic head 12 is minimized. Disk 10 is preferably a double-sided magnetic storage disk, with a second side, opposite the side shown in FIG. 1, having similar features.

Figure 2:
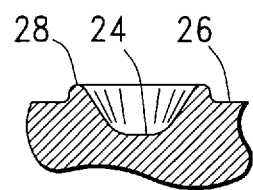
FIGS. 2 and 3 are transverse cross-sectional views of individual textured spots, which form examples of spots which may be form a textured surface which may be inspected using the apparatus of the present invention.
Figure 3:
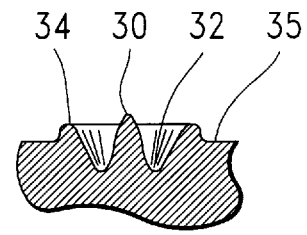

FIGS. 2 and 3 are transverse cross-sectional views of individual textured spots, which form examples of spots which may be made using the apparatus and method of the present invention.

FIG. 2 shows a portion of a disk surface roughened by the prior-art method taught by Ranjan, et al., in U.S. Pat. No. 5,062,021. With this method, a portion of the disk surface to be roughened is exposed to a pulse of laser light. The surface is heated rapidly, so that a part of the surface material is melted and then rapidly cooled, changing the surface topography to include a generally round central depression 24 below the nominal surface plane 26 and a generally round peripheral ridge 28 above this plane 26. The process described by Ranjan, et al. produces a ring of textured spots of this kind by repeatedly firing a laser as the disk being textured is rotated. The laser is then displaced radially through a pitch distance, and a second ring of textured spots, concentric with the first ring thereof, is produced. This process is repeated until texturing fills the annular region to be textured. The nature of each individual textured spot is determined primarily by the peak energy at which the laser is fired together with the pulse width. The distance between textured spots on the ring is determined by the relationship between the rate at which the laser is fired and the rotational speed at which the disk is turned.

FIG. 3 is a transverse cross-sectional profile of a laser textured spot produced using the method of the previously-described co-pending U.S. patent application, Ser. No. 08/150,525. The heights of surface features, compared to their widths, are exaggerated. A central protrusion 30 rises above the depth of the ring depression 32, preferably to a height somewhat greater than the height of the surrounding peripheral ring 34. The heights of the protrusion 30 and ring 34 above the nominally level surface 35 before texturing are determined by various laser and disk-material parameters, such as laser fluence, pulse width, spot size, and disk surface composition.

Figure 4:
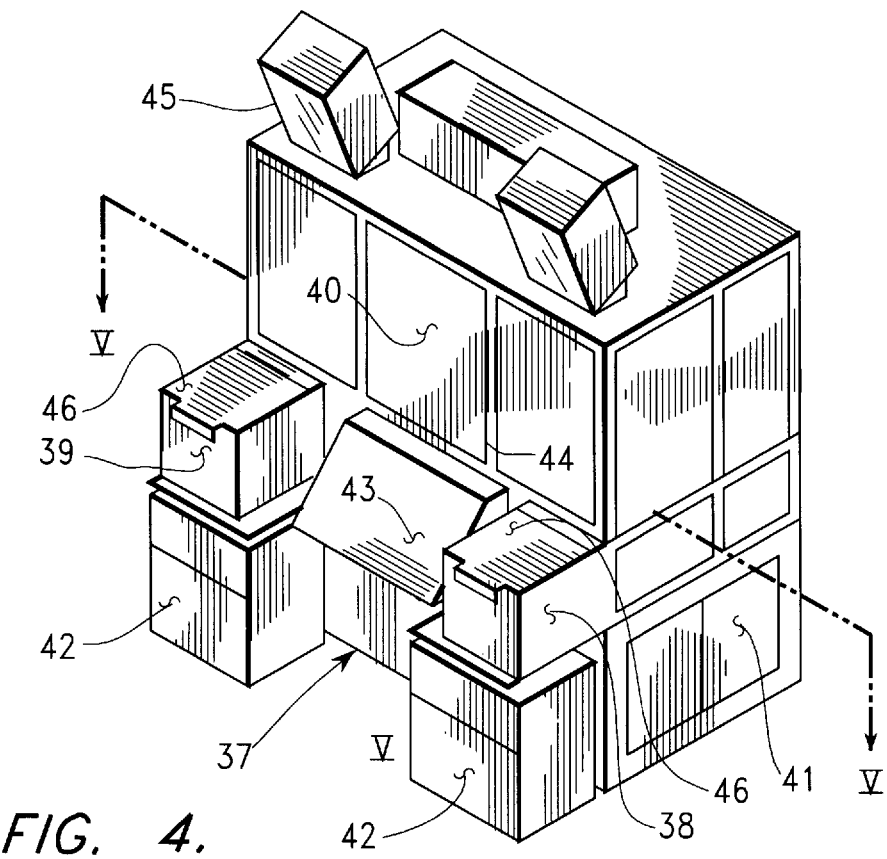
FIG. 4 is an isometric view of a laser disk texturing tool in which the present invention may be applied.

FIG. 4 is an isometric view of a laser-texturing tool 37, built in accordance with the present invention, which is used to apply laser-texturing to disks in a non-stop production mode as long as cassettes filled with disks are loaded and unloaded at a sufficient rate. These cassettes move through a right disk-handling station 38 and a left disk-handling station 39, with individual disks from these stations 38 and 39 being alternately textured by a single laser assembly in a laser-texturing station 40. A modular configuration allows the tool 37 to continue running, at a reduced rate of production, even if one of the disk-handling stations 38, 39 cannot be used.

The laser-texturing tool 37 is a self-contained system, with necessary electrical, electronic, and pneumatic components located in a base section 41 and in a pair of instrumentation cabinets 42. Various controls and output devices are placed on a slanted control panel 43. Since the infrared laser used in the texturing process produces invisible, potentially-harmful rays, a laser-texturing station 40 is housed in a light-tight cabinet within the tool 37, with a safety switch operated by the opening of each access door 44 turning off the laser. Furthermore, these doors 44 can be opened only when the tool is in a maintenance mode. The tool 37 is switched between automatic and maintenance modes by turning a mode switch (not shown) on control panel 43. Two television cameras (not shown), mounted within the laser-texturing station, allow the process to be viewed on a pair of monitors 45.

The upward-opening doors 46 of disk-handling stations 38 and 39, providing access for loading and unloading cassettes holding disks, are not interlocked, and may be opened or closed at any time, even during the operation of the texturing process. Within the tool 37, rays from the laser are blocked from the areas in which these cassettes are loaded and unloaded.

Figure 5:
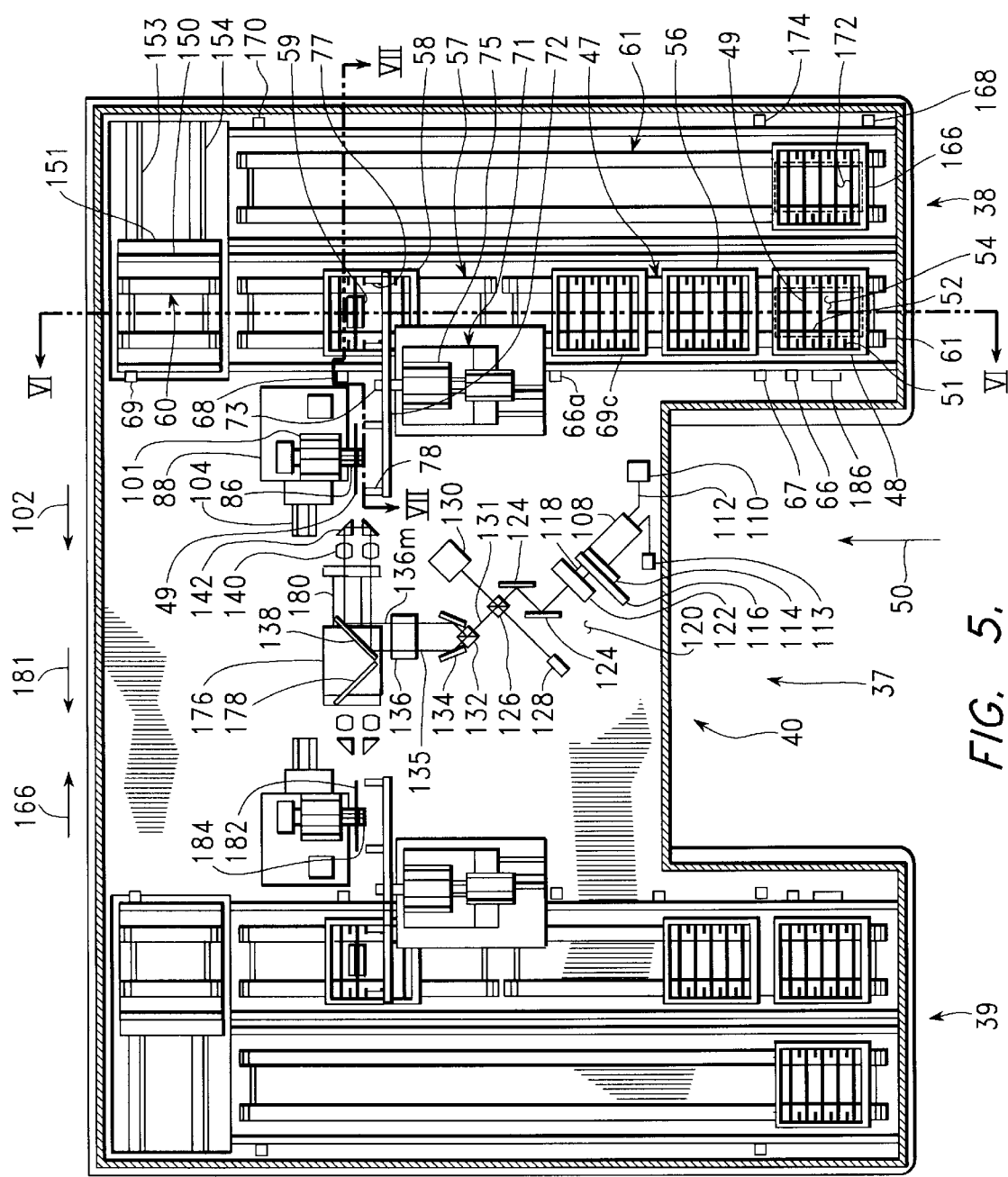
FIG. 5 is a cross-sectional plan view of the tool of FIG. 4, taken as indicated by section lines V—V in FIG. 4 to show disk-handling and laser-texturing stations thereof.

FIG. 5 is a horizontal cross-sectional view of laser-texturing tool 37, taken as indicated by section lines V—V in FIG. 4, to reveal particularly disk-handling stations 38, 39 and the laser-texturing station 40. Left disk-handling station 39 is a mirror image of right disk-handling station 38. Each disk-handling station 38, 39 has an input conveyor 47 carrying cassettes 48 loaded with disks 49 to be textured, rearward, in the direction of arrow 50. Each cassette 48 has a number of pockets 51 in which disks 49 are loaded in a vertical orientation, and a lower opening 52 allowing the removal of individual disks by lifting from below. While FIG. 5 shows cassettes having only five disks, for clarity, in reality a cassette for this system typically holds 25 disks.

Figure 6:
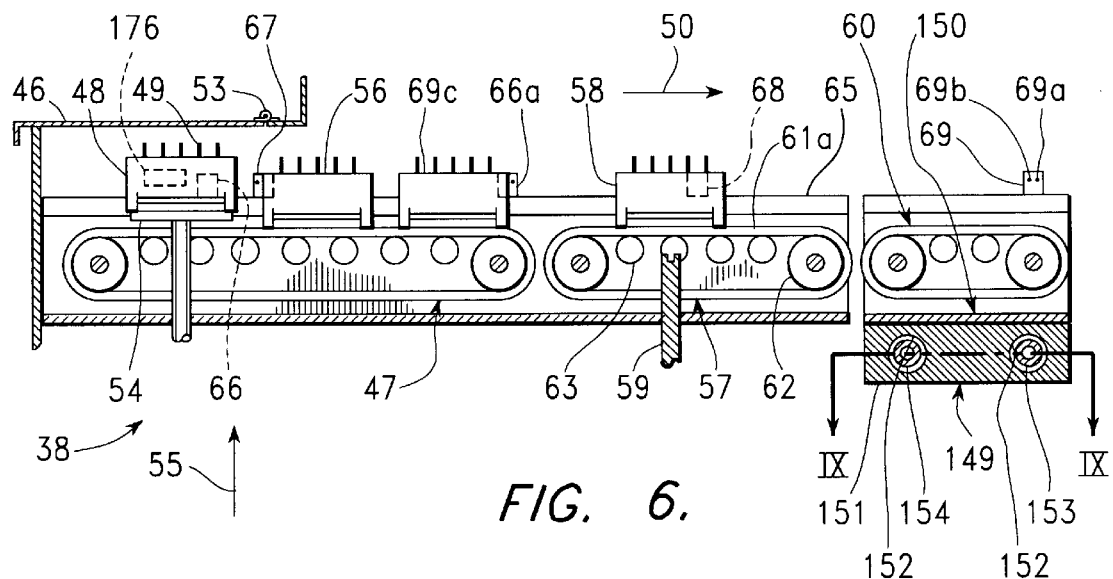
FIG. 6 is a cross-sectional side elevational view of the tool of FIG. 4, taken as indicated by section lines VI—VI in FIG. 5 to show mechanisms used to handle cassettes holding disks for texturing.

FIG. 6 is a cross-sectional side elevational view of the tool of FIG. 4, taken as indicated by cross-section lines VI—VI in FIG. 5, to show the conveyor systems moving cassettes filled with disks into and through the process. The tool operator loads a cassette 48 filled with disks 49 to be textured by opening the access door 46, which pivots upward along its rear hinge 53. The cassette 48 is normally loaded onto a raised platform 54, which, in this position holds the cassette 48 upward, in the direction of arrow 55, away from input conveyor 47, allowing this conveyor 47 to move another cassette 56 stored in a queue on the conveyor 47 without simultaneously moving the most-recently loaded cassette 48. FIG. 6 also shows a cassette indexing conveyor 57, which moves a cassette 58 in incremental motions above a disk lifter 59, so that the disk lifter 59 can remove individual disks 49 from the cassette 58 for placement into the laser-texturing process, and so that the disk lifter 59 can subsequently return textured disks to the cassette 58. FIG. 6 also shows a transfer table conveyor 60, which is used in the movement of cassettes filled with textured disks from indexing conveyor 57 to an output conveyor 61 (shown in FIG. 5).

Figure 7:
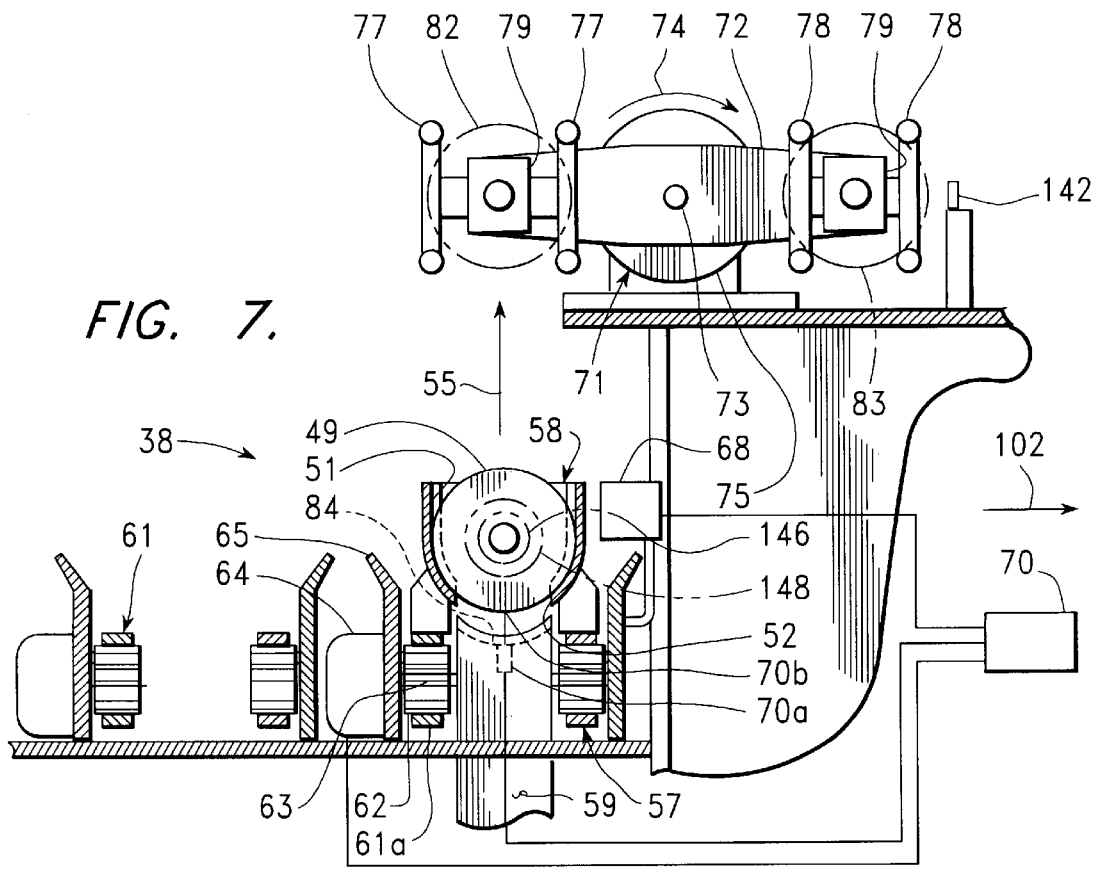
FIG. 7 is a cross-sectional rear elevational view of the tool of FIG. 4, taken as indicated by section lines VII—VII in FIG. 5 to show the mechanism used to transfer disks from cassettes within the disk-handling stations to the laser-texturing station and to return the disks to the cassettes.

FIG. 7 is a cross-sectional rear elevational view of the tool of FIG. 4, taken as indicated by section lines VII—VII in FIG. 5 to show the mechanism used to transfer disks from a cassette 58 within the disk-handling station 38 into the laser texturing process and to return textured disks to the cassettes. FIG. 7 also provides a transverse cross-sectional views of cassette indexing conveyor 57 and of output conveyor 61.

The movement of a cassette to the point at which individual disks are removed from the cassette to be carried into the texturing process will now be discussed, with particular reference being made to FIGS. 6 and 7.

Thus, referring to FIGS. 5, 6, and 7, each conveyor 47, 57, 60, 61 includes a belt 61a extending under each side of a cassette 48, 56, 58 loaded thereon. Each belt 61a extends between a pair of end rollers 62 and above a number of idler rollers 63. At one end of each conveyor 47, 57, 60, 61 the end rollers 62 are driven in either direction by a motor 64. This system for cassette transport also includes a pair of lateral guides 65, ensuring that each cassette stays in place atop the conveyors, and cassette detectors 66, 66a, 67, 68, 69, which determine when a cassette reaches an adjacent point along a conveyor system. Each cassette detector 66, 66a, 67, 68, 69 includes a light source 69a which is reflected off an adjacent surface of a cassette when such a surface is present, to be detected by a receiver 69b, which in turn provides an input to a computing system 70 controlling the operation of the motors 64 and other motors, solenoids, and valves within the laser-texturing tool 37 to effect operation as described herein.

When cassette 48 is placed on top of raised platform 54, its presence is detected by first input cassette detector 66. Since the input conveyor 47 and the system logic controlling its movement are configured to allow the queuing of cassettes, the subsequent movement of the cassette 48 is determined by whether other cassettes are already present on input conveyor 47 and indexing conveyor 57. If no cassette is already present on these conveyors 47, 57 (i.e., if cassettes 56, 58, and 69c are not present), platform 54 is lowered, so that the cassette 48 rests on top of input conveyor 47, and the conveyors 47, 57 are turned on to move cassette 48 rearward, in the direction of arrow 50. When indexing cassette detector 68 detects the presence of a cassette being moved in this way, input conveyor 47 and indexing conveyor 57 are stopped, leaving the cassette positioned so that the first of its pockets 51 in which diskettes 49 may be placed (i.e. the end pocket farthest in the direction indicated by arrow 50) is directly over disk lifter 59.

On the other hand, if a cassette 58 is present on indexing conveyor 57, and if no other cassette 56, 69c is present on input conveyor 47, when cassette 48 is placed on raised platform 54, this platform 54 is lowered, and conveyor 47 is turned on to move cassette 48 in the direction of arrow 50. This movement is stopped when the presence of the cassette 48 is detected by second input cassette detector 66a, leaving the cassette queued on the input conveyor 47, in the position in which cassette 69c is shown.

If a cassette 58 is present on indexing conveyor 57, and if a single cassette 69c is present on input conveyor 47, when cassette 48 is placed on raised platform 54, this platform 54 remains raised while input conveyor 47 is turned on to move cassette 69c opposite the direction of arrow 50 until this cassette 69c is sensed by third cassette sensor 67. Then, platform 54 is lowered, and input conveyor 47 is turned on to move both cassettes 48, 69c in the direction of arrow 50. This movement is stopped when cassette 69c is detected by second cassette sensor 66a, leaving both cassettes 48, 69c queued on input conveyor 47.

Finally, if all three cassettes 56, 69c, and 58 are present on conveyors 47, 57 when cassette 48 is placed on raised platform 54, the movement of cassettes does not directly ensue, leaving cassettes 56, 69c queued on input conveyor 47 and cassette 48 queued on raised platform 54.

When the texturing process has been completed on all of the disks 49 to be textured within the cassette 58 on indexing conveyor 57, this conveyor 57 and transfer table conveyor 60 are turned on to move the cassette 58 rearward, in the direction of arrow 50, completely onto the transfer table conveyor 60. This motion is stopped when the presence of cassette 58 is detected by transfer table cassette detector 69. If cassette 56 is present on input conveyor 47, as determined by second input cassette detector 67, when cassette 58 is transferred from indexing conveyor 57 in this way, this queued cassette 56 is moved by conveyors 47, 57 to the point at which its presence is detected by indexing cassette detector 68. If a second queued cassette 48 is present on raised platform 54 when a first queued cassette 56 is moved from input conveyor 47 to indexing conveyor 57, platform 54 is lowered, and the first queued cassette 48 is driven by input conveyor 47 until the presence of the cassette 48 is detected by second input cassette detector 67.

The movement of an individual disk from a cassette into the texturing process will now be discussed, with particular reference being made to FIGS. 5 and 7.

Thus, referring to FIGS. 5 and 7, to allow the movement of individual disks 49 through the laser-texturing process, indexing conveyor 57 moves cassette 58 in a number of rearward and forward motions, in and opposite the direction of arrow 50, sequentially aligning the individual disk pockets 51 of the cassette 58 with a disk lifter 59. Disk lifter 59 includes a proximity sensing mechanism 70a, for determining whether a disk 49 is present in each pocket 51. This sensing mechanism 70a consists of an internal light source aimed at an adjacent edge 70b of a disk present in a pocket 51 and an internal sensor detecting light reflected from such an edge 70b. The output of sensing mechanism 70a provides an additional input to computing system 70. Thus, cassette 58 is moved to the rear, in the direction of arrow 50, by indexing conveyor 57, until proximity sensing mechanism 70a indicates the presence of a disk 49 in a particular pocket 51, passing any empty pockets 51 within the cassette 58. When a disk is detected by proximity sensing mechanism 70a, the rearward movement of cassette 58 is stopped, and the disk lifter 59 moves upward, in the direction of arrow 55, carrying the disk 49 which is aligned the lifter 59 upward for transfer to a pick-and-place mechanism 71.

Pick-and-place mechanism 71 has an arm 72 rotatable about the axis of a drive shaft 73, in and opposite the direction of arrow 74, in 180-degree increments. This rotation is effected by the incremental operation of arm drive motor 75. At each end of arm 72, a pair of grippers 77, 78 is movable between an open position, in which grippers 77 are shown, and a closed position, in which grippers 78 are shown, by means of a pneumatic actuator 79. When a pair of grippers 77, 78 is in the closed position, a disk placed between the grippers is held by four points around its periphery. When the pair of grippers is opened, a disk held in this way is released. The pick and place mechanism 71 is also moved rearward, in the direction of arrow 50, into a position in which disks are picked up and released, and forward, in the direction opposite arrow 50, into a position in which arm 72 is rotated.

The upward movement of disk lifter 59 carries a disk 49, which is to be textured next, upward into the location indicated by phantom line 82. This motion, which brings the disk 49 into vertical alignment with the open grippers 77 of arm 72, occurs with pick and place mechanism 71 in its forward position (i.e., moved opposite the direction of arrow 50), allowing the upward passage of disk 49 past grippers 77. At this point, the disk rests within a groove 84 of the lifter 59. Next, pick and place mechanism 71 moves in the direction of arrow 50 to its rearward position, aligning the open grippers 77 with the edge of disk 49. Then, grippers 77 are closed, grasping the disk 49. Disk lifter 59 next descends to disengage from the periphery of disk 49. Next, pick and place mechanism 71 moves opposite the direction of arrow 50 to its forward position, and the arm 72 rotates 180 degrees in the direction of arrow 74, placing disk 49 in the position indicated by phantom line 83, in axial alignment with a spindle 86 of a spindle assembly 88. Then, pick-and-place mechanism 71 returns in the direction of arrow 50 to its rearward position, placing the disk 49 on the end of spindle 86.

Figure 8:
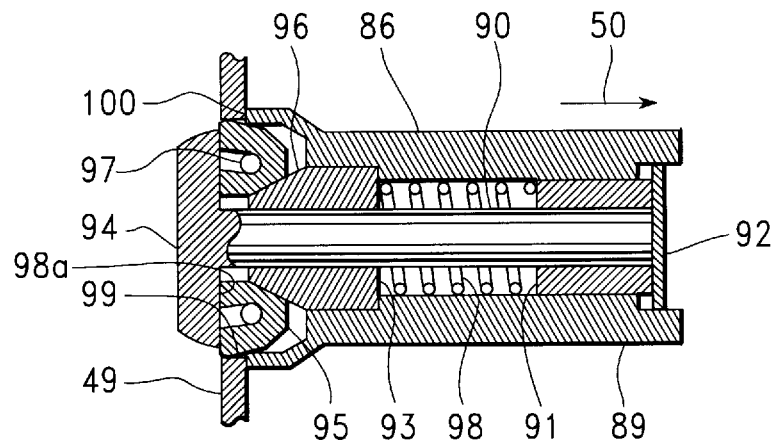
FIG. 8 is a longitudinal cross-sectional view of an end portion of a spindle, used to move disks through the texturing process in the tool of FIG. 4.

FIG. 8 is a longitudinal cross-sectional view of the end of spindle 86, which includes a rotationally-driven outer cylinder 89, in which an internal shaft 90 slides axially, in and opposite the direction of rearward-pointing arrow 50. A sliding bushing 91 and a piston 92, and a front end cap 94 move axially with internal shaft 90, while a front bushing 93 is held in place within the outer cylinder 89. A number of curved clamping blocks 95 extend around a truncoconical surface 96 of front bushing 93, being held inward, against this surface 96, by an elastomeric "O"-ring 97.

The internal shaft 90 is held in the rearward position shown (i.e. in the direction of arrow 50) by means of a compression spring 98 pressing an adjacent surface of the sliding bushing 91. With internal shaft 90 held rearward in this way, inner face 98a of end cap 94 pushes clamping blocks 95 rearward and outward, along truncoconical surface 96. This motion of the clamping blocks 95 grasps inner surface 99 of the disk 49, holding the disk in place against a front face 100 of outer cylinder 89. The disk 49 is released by applying a force to piston 92 in a forward direction, opposite the direction of arrow 50, to overcome the force exerted by compression spring 98, so that the internal shaft 90 is moved forward, opposite the direction of arrow 50. This force may be applied by a number of well known methods, such as through a pneumatically operated push-rod operating on piston 92. The resulting movement of end cap 94 allows the clamping blocks 95 forward and inward, releasing disk 49 from the spindle 86.

Referring to FIGS. 5, 7, and 8, pick-and-place mechanism 71 next moves to the rear, in the direction of arrow 50, placing the disk 49 to be textured, which is now at the position indicated by phantom line 83 in FIG. 7, on end cap 94 of spindle 86, with inner shaft 90 held in its forward position, so that clamping blocks 95 are retracted inward. Next, inner shaft 90 is moved to its rearward position, so that clamping blocks 95 are moved outward, clamping the disk 49 in place, and the grippers, which have been holding the disk on arm 72, open, releasing the disk 49. After disk 49 is placed on spindle 86, the pick-and-place mechanism 71 moves forward, opposite the direction of arrow 50, and the spindle drive motor 101 of spindle assembly 88 begins to rotate spindle 86 to bring the disk 49 up to a rotational velocity at which exposure to laser pulses will occur. The spindle assembly 88 also begins to move inward, in the direction of arrow 102, being driven by a spindle translation motor 104, carrying the disk 49 into the texturing process.

The laser-texturing station 40 will now be discussed, with specific references being made to FIG. 5.

Thus, referring to FIG. 5, within the laser-texturing station 40, a beam from an infrared pulsed laser 108 is used to produce the desired surface texturing on the disk 49. As described in the co-pending application referenced above, the laser 108 may be, for example, a Nd:YLF solid state laser, providing an output at a wavelength of 1.047 microns, or $Nd:YVO_4$ solid state laser, operated with a diode pumping signal, driven from a laser diode 110 through a fiber-optic cable 112, and pulsed by a Q-switch control 113. A beam from the laser 108 is directed through an electronic process shutter 114 and a mechanical safety shutter 116. When the laser-texturing station 40 is operating, a train of laser pulses is emitted from the laser 108, with the actual texturing process being started and stopped by opening and closing the electronic process shutter 114.

The process shutter 114 is actually a mechanical shutter which is opened and held open by the operation of an electromagnet (not shown). The termination of the flow of current through the electromagnet causes the process shutter to close. The operation of process shutter 114, and hence of the process of texturing an individual disk, is electronically controlled in response to the position of the disk to be textured, as determined through the use of a signal generated in response to the movement of, for example, the spindle assembly 88.

The safety shutter 116 remains open during the entire texturing process, unless an error condition, such as a jam of a disk or cassette, occurs. The detection of such an error condition causes the safety shutter 116 to close, by means of the software running the laser-texturing tool 37. The laser 108, electronic process shutter 114, and safety shutter 116 together form a light-tight assembly, from which even a portion of the laser beam cannot escape when either shutter 114, 116 is closed.

After passing through the shutters 114, 116, the laser beam enters a polarizing beamsplitter 118, which is oriented so that the portion of the laser beam, if any, having an unwanted p-polarization is directed downwards toward an underlying plate 120, leaving the portion of the laser beam having a vertical s-polarization to propagate through the remaining optical path. Next, the laser beam passes through a 3× beam expander/collimator 122, which permits the adjustment of the infrared laser spot size at a lens entrance.

Figure 5A:
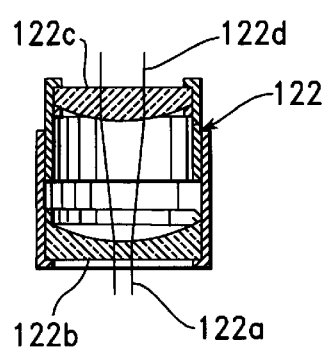
FIG. 5A is a longitudinal cross-sectional view of a beam expander in the tool of FIG. 4.

FIG. 5A is a longitudinal cross-sectional view of the beam expander/collimator 122. The input beam 122a passes through a diverging lens 122b, which causes the divergence, or expansion, of the beam, and through a converging lens 122c, which reduces the divergence of the beam leaving as output beam 122d. The distance between the beam expander lenses 122b, 122c is manually adjustable through the rotation of a threaded mechanical connection between the lens mounts. In the example of the laser-texturing tool 37, this adjustment is made to provide a slightly diverging output beam 122d.

Referring again to FIG. 5, from expander collimator 122, the laser beam is directed by a pair of dielectric-coated steering mirrors 124 to a dichroic beamsplitter 126. A visible laser beam, for example from a 2-mW laser diode 128, is also directed toward the beamsplitter 126, permitting alignment of the optical system by tracing the red laser dot. The infrared beam from laser 108 is made to be coincident with the red beam from laser diode 128 by manipulating the two steering mirrors 124. About three percent of the laser beam entering beamsplitter 126 from the infrared laser 108 is reflected from the beamsplitter 126 to a power detector 130, which provides in-situ monitoring of the laser power.

The infrared laser beam 131 leaving the dichroic beamsplitter 126 is directed to a non-polarizing beamsplitter cube 132, which splits the beam into two beams that are equal in intensity within five percent. These two beams are directed, by means of a pair of steering mirrors 134, toward opposite sides of the disk being carried through the texturing process by spindle assembly 88. After reflection off these steering mirrors 134, the laser beams travel as a pair of parallel beams 135, separated by a distance of 25 mm, to enter a power control optics block 136, in which the intensity of the two beams is balanced by controlling the voltage applied to liquid-crystal variable retarders. In this way the intensity of the parallel laser beams leaving the power control the power control optics block 136 is made equal within one percent.

Figure 5B:
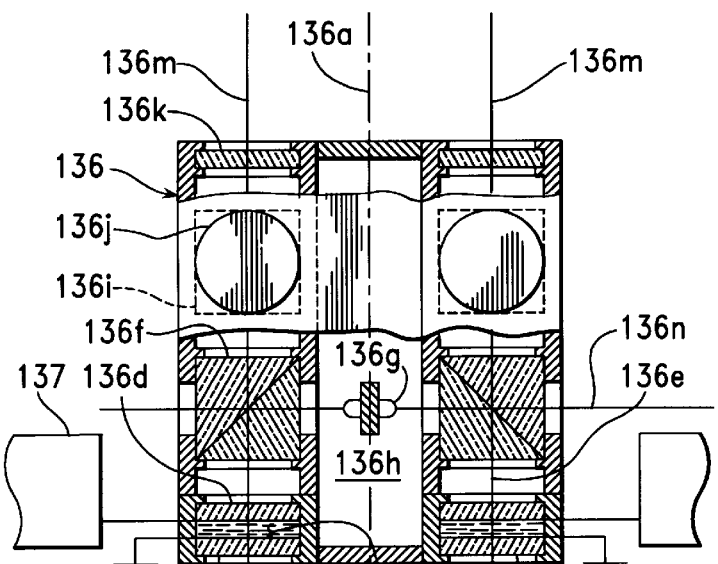
FIG. 5B is a partially sectional plan view of a beam splitter and power control optics block in the tool of FIG. 4.

FIG. 5B is a partially sectional plan view of the beamsplitter cube 132, together with steering mirrors 134 and the power control optics block 136. The two laser beams 135 forming inputs to the block 136 extend parallel to, and equally offset from, an axis 136a of the power control optics block 136, about which the various elements of this block 136 are symmetrically deployed. Symmetrical beams 135 result from the fact that the input beam 131 to the beamsplitter cube 132 is directed at a 45-degree angle with respect to the optics block axis 136a, with the reflective surface 132a within the beamsplitter cube being aligned along the optics block axis 136a. Each of the steering mirrors 134 is aligned to be struck by an associated beam from the beamsplitter cube 132 at an angle of incidence of 67.5 degrees.

Referring to FIG. 5B, adjustments for bringing the separate laser beams 135 into a parallel condition, and for otherwise aligning them, are provided by several manually turned knobs. Beamsplitter cube 132 is mounted on a rotary stage 132b, with a pair of knobs 132c tilting the cube 132 about orthogonal axes, and with a knob 132d providing for the rotation of the cube 132. For example, a rotary stage suitable for this application is supplied by the Newport Corporation of Irvine, Calif., under their part number PO32N. Each steering mirror 134 is mounted by an adjustable mirror mount 134a, which includes a pair of knobs 134b used to tilt the associated mirror 134 about mutually perpendicular axes. Mirror mounts suitable for this application are supplied, for example by the Ealing Electro Optics, Inc. Holliston, Mass., under their catalog number 37-4777.

Within the power control optics block 136, the power of the two beams 135 from beamsplitter cube 132 is balanced, so that these beams have power levels within one percent of one another. The beamsplitter cube 132 splits the single beam arriving from the laser into a pair of beams 135 having power levels within five percent of one another. While the beamsplitter cube 132 is a non-polarizing device, the laser beams 135 entering the power control optics block 136 are nominally, or predominately, s-polarized, having passed through polarizing beamsplitter 118 (shown in FIG. 5).

Within the power control optics block 136, each of these beams 135 first enters a liquid crystal variable retarder 136b. Each of these retarders 136b includes a cavity 136c formed between a pair of fused silica windows 136d spaced a few microns apart. The interior surface of each window 136d has a transparent conductive indium tin oxide coating. The cavity 136c is filled with birefringent nematic liquid crystal material with molecules that tip according to a voltage applied between the transparent conductive coatings of the windows 136c. The angle of polarization of the laser beam 135 entering each retarder 136b is changed according to the voltage applied across the cavity 136c by means of the coatings on windows 136d. Thus, the s-polarization of each beam 135 entering a retarder 136b is altered, in a continuously variable manner, toward a p-polarization of the beam 136e leaving the retarder 136b. A suitable liquid crystal variable retarder may be obtained, for example, from Meadowlark Optics, of Longmont, Colo., under their part number LVR-100-1047-V.

The voltage signal driving each liquid crystal variable retarder 136b is provided by the output of a function generator 137, which preferably produces a DC-balance 2kHz square wave having an amplitude which is adjustable to determine how the polarization of the beam passing through the retarder 136b is altered.

After exiting the retarder 136b, each beam 136e enters a polarizing beamsplitter 136f, which reflects s-polarized power inward to a beam dump 136g to be dissipated within a cavity 136h, while transmitting p-polarized energy to an non-polarizing beamsplitter 136i. Each non-polarizing beamsplitter 136i reflects about one percent of the energy incident upon it upward, providing the input to a power detector 136j. The remaining energy is transmitted through a quarter-wave plate 136k, which converts the p-polarized energy incident upon it into a circularly-polarized beam 136m exiting the power control optics block 136.

Referring to FIGS. 5 and 5B, independent means to measure and control the power levels of the single beam 135 derived from the output of laser 108 and of each of the beams 136m exiting the power control optics block 136 are provided. The power level of the single beam 131, which is measured by monitoring the output of power detector 130, is controlled, or attenuated, by varying an input signal to laser 108. The combination of a retarder 136b with a polarizing beamsplitter 136f provides a convenient way to control the power level of each beam 136m exiting the block 136, while the combination of a non-polarizing beamsplitter 136i with a power detector 136j provides a convenient means for measuring this power level. The output signals from power detectors 130, 136j are individually calibrated using measurements of beams 136m at the exit of the power control optics block, or farther along the optical path toward the point at which a disk 49 is textured. This type of calibration is generally needed because of a number of factors, such as differences in the percentage of incident power reflected within the beamsplitters 126, 136i aiming beams at these power detectors. The outputs of power detectors 130, 136j are preferably displayed externally on the laser texturing tool 37 (shown in FIG. 4).

A method for manually setting-up or readjusting the various laser power levels includes the steps of monitoring the outputs of power detector 130 and making corresponding adjustments to a signal driving the laser 108. The two beams 136m are balanced by observing the outputs of both power detectors 136j with both retarders 136b set to transmit maximum levels of p-polarized power, and by reducing the level of p-polarized power transmitted by the retarder corresponding to the higher power level read by one of the power detectors 136j, until these two detectors indicate the same power level, with calibration factors being considered. As the level of p-polarized power is decreased in either of the beams, the level of power present in the corresponding output beam 136m is decreased, as the increased s-polarized power is rejected inward by the polarizing beam splitter 136f. In this way, the output levels of the two beams are balanced by attenuating the beam initially having the higher level.

In the example of FIG. 5, the parallel laser beams 136m from power control optics block 136 are reflected off a right shuttling mirror 138, being directed toward a disk carried through the texturing process from the right disk-handling station 38.

Figure 5C:
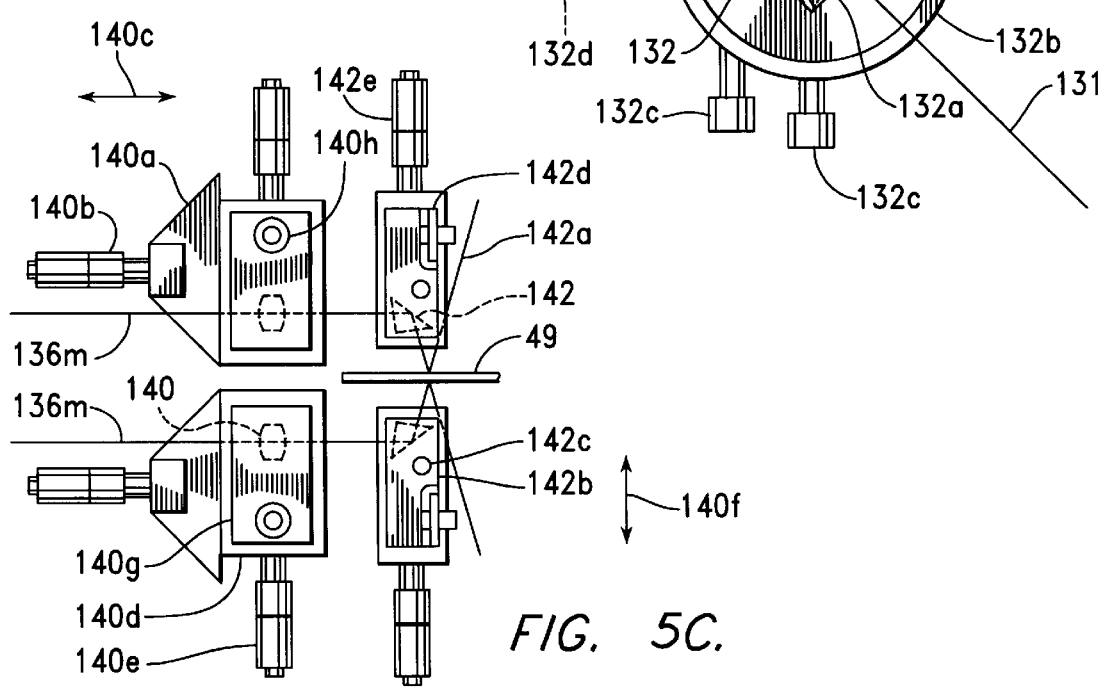
FIG. 5C is a plan view of beam directing apparatus adjacent a disk being textured within the tool of FIG. 4.

FIG. 5C is a plan view of the optical devices associated with the right disk-handling station 38. For example, each of these beams 136 m passes through a focussing achromatic triplet lens 140, having a focal length of 25 mm, and is reflected toward the surface of the disk 49 being textured by a right-angle prism 142.

Referring to FIG. 5C, each lens 140 is mounted in a finely adjustable manner, permitting the adjustments needed to center the beam and to achieve optimum focus on each side of the disk 49. A first stage 140a, moved by a first micrometer-type screw mechanism 140b allows a lens focussing adjustment in the directions of arrow 140c. A second stage 140d, moved by a second screw mechanism 140e, allows lateral movement of the lens 140, in the directions indicated by arrow 140f. A third stage 140g, in which the lens 140 is mounted, allow vertical movement through the rotation of a third mechanism 140h.

Each prism 142 is slightly tilted, so that a laser beam reflected off the surface of the disk being textured is not transmitted back through the optical path, being instead generally reflected outward as a reflected beam 142a. Each prism 142 is mounted on a pivot arm 142b, pivotally mounted by a pin 142c to a stage 142d, which is in turn moved in the directions of arrow 140f by a micrometer-type screw mechanism 142e. The pivotal movement of each pivot arm 142b may be used to set the point on the disk 49 at which texturing begins. This type of adjustment is particularly useful for adjusting the process to produce textured surfaces on each side of the disk 49, starting and ending at the same diameters on the disk. When this is done, since the pivot pin 142c is offset from the reflective surface of the prism 142, the laser beam is expected to move along this reflective surface. If this movement displaces the laser beam too far from the center of this reflective surface, the position of prism 142 is corrected with screw mechanism 142e.

Referring again to FIGS. 5 and 5A, and continuing to refer to FIG. 5C, beam expander 122 is adjusted by changing the distance between 122b and lens 122c, during the initial adjustment of this apparatus, so that the laser beam 122a entering the beam expander 122 at a diameter of about 0.5 mm leaves the beam expander 122 as beam 122d with a diameter of about 1.3 mm, and so that the beam entering a focussing lens 140 has a diameter of about 1.5 mm. This lens 140 is focussed by movement in the direction of arrow 140c, using the screw mechanism 140b, so that the laser beam has a diameter of about 20 microns at the surface of a disk 49 being textured. An independent adjustment of this kind is made to focus a beam on each side of the disk 49.

Further adjustments of the beam expander 122 and of each focussing lens 140 may be made to effect changes in the process and in the textured spots generated on the disk 49. In general, adjusting the beam expander 122 to increase the diameter of the laser beam striking each focussing lens 140 makes it possible to focus a smaller beam diameter on the disk 49.

Referring to FIGS. 5, 5B, and 5C, despite the precaution of tilting each prism 142, to prevent the return of laser power reflected off the disk 49 within the optical path, some such power can be expected to return, due particularly to reflection from the non-uniform disk surface produced by the texturing process. However, the s-polarized light reflected back along the optical paths in this way is rejected by each polarizing beamsplitter 136f in the power control optics block 136, being directed outward as a beam 136n.

The movement of a disk through the laser-texturing process, and its subsequent return to the cassette from which it has been taken, will now be discussed, with particular reference being made to FIGS. 5 and 7.

Thus, referring to FIGS. 5 and 7, the disk 49 clamped to spindle 86 is first brought up to the rotational speed desired for the texturing process, as the motion of spindle assembly 88 drives the disk 49 inward, in the direction of arrow 102, to or past the point at which the inner diameter, indicated on FIG. 7 by phantom line 146, of the surfaces to be textured is adjacent to the point at which exposure will occur to laser beams reflected from prisms 142. The actual exposure, which is started by opening electronic process shutter 114, occurs as the disk 49 is rotated, for example, at a constant speed, by spindle drive motor 101 and as the disk 49 is moved in the outward direction, opposite arrow 102, for example, at a constant speed, by the spindle translation motor 104. When the disk 49 passes the point at which the outer diameter, indicated by phantom line 148, of the surfaces to be textured is adjacent to the point at which exposure occurs to laser beams reflected from prisms 142, electronic process shutter 114 is closed to terminate the exposure of the surfaces of disk 49 to the laser beam. Thus, an annular space on disk 49 is textured by placing a number of laser-generated texture patterns along a spiral, with the distance between the patterns adjacent along the spiral being determined by the rate at which laser 108 is pulsed, and by the rate of rotation of spindle 86, while the distance between radially adjacent segments of the spiral is determined by the rates of rotation and translation of spindle 86.

After completion of the texturing process, the rotation of spindle 86 is stopped, or allowed to decelerate, as the spindle assembly 88 continues moving outwardly, opposite arrow 102, to stop in the position adjacent to grippers 78, at the inward-extending end of the arm 72. At this point, the arm 72 is held forward, in the direction opposite arrow 50, so that the disk 49 can pass behind the grippers 78, which are held open. When this outward motion of spindle assembly 88 is complete, and when the rotational motion of spindle 86 is fully stopped, the arm 72 is moved rearward, and the grippers are closed to engage the disk 49. Next, the shaft 90 (shown in FIG. 8) is moved forward so that the clamping blocks 95 (also shown in FIG. 8) are retracted inward, releasing the disk 49 from spindle 86. Then, the arm 72 is moved forward, opposite the direction of arrow 50, and arm 72 is rotated 180 degrees about the axis of its drive shaft 73, opposite the direction of arrow 74, and the arm 72 is moved rearward, in the direction of arrow 50, moving the disk 49, which has most recently been textured, into position above the disk lifter 59. Next, lifter 59 moves upward, accepting the textured disk in its groove 84. The grippers on arm 72 holding the textured disk are opened, and the lifter 59 then descends, placing the textured disk 49 in a pocket 51 within the cassette 58.

The preceding discussion has described the movement of a single disk 49 from the cassette 58, in right disk-handling station 38, through the texturing process in laser-texturing station 40, and back into the cassette 58. In a preferred version of the present invention, two disks are simultaneously moved in opposite directions between the cassette 58 and the spindle 86, which carries each disk through the texturing process. This type of disk movement will now be described, with particular references being made to FIGS. 5 and 7.

Referring to FIGS. 5 and 7, except during the movement of the first and last disks 49 held within an individual cassette 58, each rotational movement of arm 72 in or opposite the direction of arrow 74 preferably carries one disk 49 from the disk lifter 59 to spindle 86 within grippers 77, while another disk 49 is simultaneously carried within grippers 78 from the spindle 86 to disk lifter 59. Sequential rotational movements of arm 72, which are similar in their movement of disks, occur in opposite rotational directions to avoid the winding of air hoses to actuators 79 and of wires to grippers 77, 78, which would occur if such movements were to continue in one direction.

Furthermore, a preferred version of the present invention returns each textured disk 49 to the cassette pocket 51 from which it has been taken, leaving the pockets 51 which have been determined to be empty by proximity sensor 70a in an empty condition. These conditions are achieved in a preferred version of the present invention, by allowing the simultaneous movement of two disks 49 by the pick and place mechanism 71, and by using the indexing conveyor 57 to return cassette 58 to the position in which disk lifter 59 accesses the pocket from which a disk 49 was taken before replacing the disk 49 in the cassette 58.

As a disk 49, which is hereinafter called the "A" disk 49 for convenience, is being taken through the texturing process by spindle 86, a "B" disk 49, which is the next disk 49 in the direction opposite arrow 50 past the cassette pocket 51 from which the "A" disk 49 has been taken, is found by movement of the cassette 58 in the direction of arrow 50 past the proximity sensor 70a. At this point, the movement of cassette 58 is stopped, and disk lifter 59 moves the "B" disk 49 upward, into the position indicated by phantom line 82. When the process of texturing the "A" disk 49 is finished, spindle 86 moves the "A" disk 49 into the position indicated by phantom line 83. When both the "A" and "B" disks 49 have been positioned in this way, pick-and-place mechanism 71 moves to the rear, in the direction of arrow 50, and both sets of grippers 77, 78 are closed to grasp the "A" and "B" disks 49. Within the spindle 86, shaft 90 (shown in FIG. 8) is moved to the front, moving clamping blocks 95 inward to disengage the spindle from the "A" disk 49, and the disk lifter 59 moves downward to disengage from the "B" disk 49. Next, the pick-and-place mechanism 71 moves forward, opposite the direction of arrow 50, and the arm rotational drive motor 75 drives arm 72 through a 180-degree angle in the direction of arrow 74. Now, the positions of the "A" and "B" disks 49 are reversed, with the "A" disk 49 being positioned for movement through the texturing process on spindle 86, and with the "B" disk 49 being positioned for return to cassette 58. Next, pick-and-place mechanism 71 moves to the rear, in the direction of arrow 50, placing the "B" disk 49 on spindle 86, and aligning the "A" disk 49 with disk lifter 59.

Thus, a first disk transfer point is established at the disk location shown by phantom line 82, and a second disk transfer point is established at the disk location shown by phantom line 83, both with pick-and-place mechanism 71 moved to the rear, in the direction of arrow 50. At the first disk transfer point, a disk 49 is transferred in either direction between pick-and-place mechanism 71 and disk lifter 59. At the second disk transfer point, a disk 49 is transferred in either direction between pick-and-place mechanism 71 and spindle 86.

In a preferred mode of operation, computing system 70 stores data indicating the pocket 51 within cassette 58 from which each disk is taken. This data is subsequently used to determine how the cassette 58 is moved opposite the direction of arrow 50 to return to the place from which the "A" disk 49 has been taken. When a cassette full of disks to be textured has been loaded into the disk-handling station 38, the cassette is moved one pocket position in the direction opposite that of arrow 50, from the position in which the pocket at which "B" disk 49 has been taken is directly above disk lifter 59, to the position in which the pocket at which "A" disk 49 has been taken is above disk lifter 59. If the cassette 58 was not full of disks 49 to be textured when it was loaded into disk-handling station 48, the cassette 58 may have to be moved farther than one pocket position opposite the direction of arrow 50. In any case, the cassette is moved so that the pocket from which the "A" disk 49 was taken is above disk lifter 59, using disk position data stored within computing system 70 and moving the cassette using indexing conveyor 57. This cassette movement can occur as the "A" disk is being moved, by pick-and-place mechanism 71, into place for reinsertion into the cassette 58, with the pick-and-place mechanism 71 moved forward, opposite the direction of arrow 50.

Next, disk lifter 59 moves upward, engaging "A" disk 49 within its groove 84, and the shaft 90 (shown in FIG. 8) is moved rearward, in the direction of arrow 50, so that clamping blocks 95 are extended outward to hold "B" disk 49 (also shown in FIG. 8) on the spindle 86. The grippers holding the "A" disk are opened, and disk lifter 59 moves downward, restoring "A" disk 49 into the pocket 51 from which it was taken, and spindle 86 moves inward, in the direction of arrow 102, while rotationally accelerating the disk to the rotational velocity at which texturing will occur. In this way, preparations are made to texture the next disk 49, which is, at this time, the "B" disk.

The first disk 49 taken from each individual cassette 58 is moved alone from disk lifter 59 to spindle 86, without the simultaneous movement of another disk 49 in the opposite direction, since there is no other disk available for such movement. Similarly, the last disk 49 taken from each individual cassette 58 is moved alone from spindle 86 to disk lifter 59, since there is no other disk available for movement in the opposite direction. The determination that the last disk 49 to be textured has been removed from the cassette 58 is made when the last pocket 51 into which disks 49 can be placed is moved past disk lifter 59 without the detection of another disk 49 by proximity sensor 70a. Only a single cassette 58 at a time is moved onto indexing conveyor 57, with all of the disks 49 to be textured within the cassette 58 being removed from the cassette 58, sent through the texturing process, and returned to the cassette 58 before any of the disks 49 in the next cassette 58 are so processed.

Figure 9:
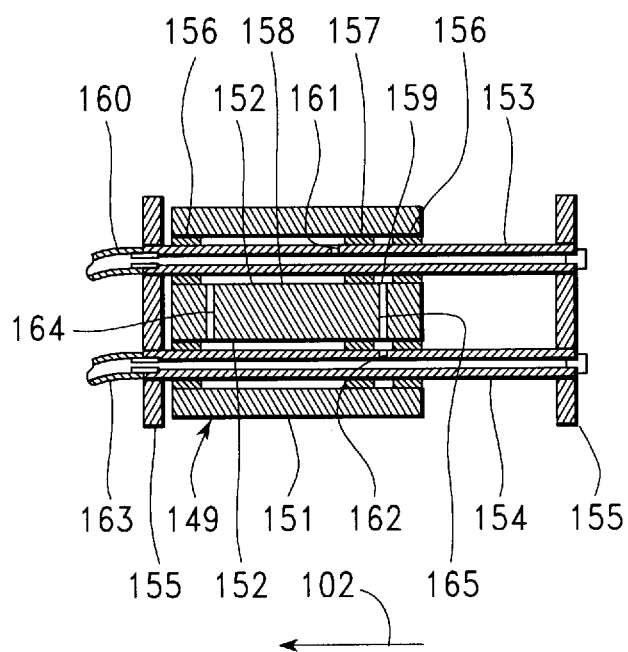
FIG. 9 is a cross-sectional plan view of a slider used to move cassettes filled with textured disks from one conveyer to another in the tool of FIG. 4.

FIG. 9 is a cross-sectional plan view of a slider mechanism 149 used to move a transfer table 150 on which cassettes are transferred from indexing conveyor 57 to output conveyor 61, taken as indicated by section lines IF—IF in FIG. 6.

Referring to FIGS. 6 and 9, the transfer table 150 is mounted atop slider mechanism 149, including a slider 151, having a pair of cylinders 152, through which a pair of hollow shafts 153, 154 extend. The shafts 153, 154 are in turn mounted to extend between end blocks 155. The slider 151 is slidably mounted on the shafts 153, 154 by means of bearing assemblies 156, which also include air-tight seals preventing the outward flow of air from the ends of cylinders 152. A central piston 157 is also attached to slide with the slider 151 along each shaft 153, 154. Each piston 157 includes seals separating the cylinder 152, within which it is attached, into an inward chamber 158 and an outward chamber 159, each of which is alternately filled with compressed air or exhausted to effect movement of the slider 151.

To move slider 151 inward, in the direction of arrow 102, compressed air is directed to the inward chambers 158, from hose 160, through a hole 161 in shaft 153. As this occurs, air is exhausted from outward chambers 159, through a hole 162 in shaft 154, and through hose 163. Both inward chambers 158 are connected by an inward transverse hole 164, and both outward chambers 159 are connected by an outward transverse hole 165. Thus, as compressed air is directed through hose 160 while hose 163 is exhausted to the atmosphere, the resulting expansion of inward chambers 158, together with a contraction of outward chambers 159, moves slider 151 inward, in the direction of arrow 102, aligning transfer table conveyor 60 with indexing conveyor 57.

Similarly, to move slider 151 outward, opposite the direction of arrow 102, compressed air is directed to the outward chambers 159, from hose 163, through hole 162 in shaft 154. As this occurs, air is exhausted from inward chambers 158, through hole 161 in shaft 153, and through hose 160. Thus, as compressed air is directed through hose 163 while hose 160 is exhausted to the atmosphere, the resulting expansion of outward chambers 159, together with a contraction of inward chambers 158, moves slider 151 outward, opposite the direction of arrow 102, aligning transfer table conveyor 60 with output conveyor 61.

The movement of a cassette 58 following the return thereto of all disks 49, having been textured, will now be discussed, with specific references being made to FIGS. 5, and 6.

Thus, referring to FIGS. 5 and 6, when it is determined that the last disk 49 to be textured in a cassette 58 has been processed and returned to the cassette 58, both intermediate conveyor 57 and transfer table conveyor 60 are turned on to move the cassette 58 rearward, in the direction of arrow 50, until the cassette 58 is completely on transfer table conveyor 60, as indicated by the output of transfer table cassette sensor 69. Upon the indication of sensor 69, movement of conveyors 57 and 60 is stopped, and a slider mechanism 149 is operated to drive the transfer table1150, which includes transfer table conveyor 60, in an outward direction, opposite the direction of arrow 102 along hollow shafts 153, 154. After this motion is stopped with transfer table conveyor 60 in alignment with output conveyor 61, the conveyors 60, 61 are turned on to move cassette 58 to the front, opposite the direction of arrow 50. If other cassettes are not stored along the output conveyor 61, this movement is stopped when the cassette has been brought to the front of the conveyor 61, to the position in which cassette 166 is shown in FIG. 5, as indicated by a first output cassette sensor 168. At this point, the cassette 166, with processed disks 49, is ready for removal from the disk texturing tool 37.

Continuing to refer to FIG. 5, while this condition of readiness is preferably communicated to the system operator through a visible or audible indication, the removal of a cassette 166 with textured disks 49 is not generally required to permit continued operation of the disk texturing tool 37. Space is provided along output conveyor 61 for the storage of a number of cassettes 166 filled with textured disks 49. In a first version of this output system, all such cassettes 166 are stored along the surface of output conveyor 61. In a second version of this output system, the first cassette to reach the front of output conveyor 61 is stored on a raised platform The operation of the first version of this output system will now be described. In this version, if a cassette 166 is waiting for removal at the front of output conveyor 61 when the processing of disks 49 within another cassette 58 is completed, output conveyor 61 is turned on to move the cassette 166 rearward, in the direction of arrow 50. This movement is stopped when the presence of cassette 166 is detected by a second output cassette sensor 170. Then, with transfer table conveyor 60 in alignment with output conveyor 61, both transfer table conveyor 60 and output conveyor 61 are turned on to move cassettes 166 and 58 together to the front of conveyor 61, where this motion is stopped as first output cassette sensor 168 detects the presence of cassette 166. If necessary, this process is repeated several times, until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches first output cassette sensor 168.

The operation of the second version of this output system will now be described. This version requires an additional cassette lifting platform 172, which is similar to the platform 54 used with input conveyor 47, and a third output cassette sensor 174. With this version, the first cassette 166 to reach the end of output conveyor 61 is raised off the conveyor with lifting platform 172, to remain in a raised position until it is removed by the tool operator. With a cassette 166 in the raised position, output conveyor 61 is operated in both directions while not affecting the position of the cassette 166. Thus, when a second cassette, such as cassette 58, is loaded onto output conveyor 61, this conveyor 61 is turned on to drive the cassette forward, in the direction opposite arrow 50. This motion is stopped when the cassette is detected by third output cassette sensor 174. When the disks in a third cassette are completed, output conveyor 61 is turned on to drive the second cassette rearward. This motion is stopped when the second cassette is detected by second output cassette sensor 170. Then both transfer table conveyor 60 and output conveyor 61 are turned on to move the second and third cassettes forward, opposite the direction of arrow 50, until the second cassette is detected by third output cassette sensor 174.

Again, this process is repeated until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches third output cassette sensor 174. These movements occur as the first cassette 166 remains on raised platform 172.

At any point, if the cassette 166 on platform 172 is removed by the tool operator with one or more cassettes remaining on output conveyor 61, the conveyor 61 is turned on to drive the next cassette to the end of the conveyor 61, as detected by first output cassette sensor 168. The platform 172 is again raised to lift this cassette off output conveyor 61.

The methods described above for handling cassettes provide the particular advantage of not operating any conveyor system 47, 57, 60, 61 in sliding contact with a cassette. The generation of wear particles from relative motion between conveyor systems and cassettes is therefore avoided. Such wear particles could otherwise contaminate the manufacturing process of which this texturing is a part. Furthermore, the useful life of conveyor belts and cassettes is increased, with cassettes and conveyer belts being likely to last as long as various other moving parts of the disk texturing tool 37.

The configuration of output conveyor 61 extending alongside input conveyor 47 provides the advantage of bringing output cassettes, holding disks which have gone through the texturing process, back to a place adjacent to the place where input cassettes are loaded. This facilitates servicing the tool 37 by personnel who must both load and unload cassettes. Furthermore, additional space for queuing cassettes along the conveyors is gained without having to increase the length of the tool 37 along the conveyors.

The preceding discussion of the movement of cassettes and disks has focussed on such movement within right disk-handling station 38 of the laser-texturing tool 37. Thus, the various movements of disks and cassettes described above are used alone if the left disk-handling station 39 is not available. For example, the left disk-handling station may not be available due to a technical problem, or simply because cassettes have not been loaded into it. Furthermore, an embodiment of the present invention has only a single disk-handling tool, which is operated as described in detail above. Nevertheless, in the preferred method of operation of the preferred embodiment of the present invention, which will now be described with particular reference being made to FIG. 5, both right disk-handling station 38 and left disk-handling station 39 are used in an alternating fashion to present disks to be textured within laser-texturing station 40.

Thus, referring to FIG. 5, in a preferred version of the present invention, the operation of left disk-handling station 39 is generally the same as operation of right disk-handling station 38, with various elements of the apparatus within the left disk-handling station 39 being mirror image configurations of corresponding elements within the right disk-handling station 38. The preceding discussion of operations within right disk-handling station 38 is equally applicable to operations within left disk-handling station 39, with rearward motions, in the direction of arrow 50, remaining the same, and with inward motions, in the direction of arrow 102 continuing to be directed toward the center of the laser texturing tool 37, in the direction of arrow 166, within left disk-handling station 39. Similarly, forward motions, opposite the direction of arrow 50 are in the same direction in both left and right disk-handling stations 38, 39, while outward motions in left disk-handling station 39 are opposite the direction of arrow 166.

Within disk-texturing station 40, right shuttling mirror 138 is mounted on a mirror slide 176, together with a left shuttling mirror 178. Mirror slide 176 is operated pneumatically, sliding on a pair of shafts 180, using a mechanism operating generally as described above in reference to FIG. 9. With mirror slide 176 in its leftward position, moved in the direction of arrow 181 as shown in FIG. 5, the laser beams passing through power control optics block 136, having been derived from the output of infrared laser 108, are directed to disk 49, clamped on spindle 86 of right disk-handling station 39, as previously described. Mirror slide 176 is alternately moved into a rightward position, so that the laser beams passing through power control optics block 136 reflect off left shuttling mirror 178, being directed to a disk 182 held by spindle 184 of left disk-handling station 39. In this way, the laser beams employed in the disk texturing process are directed to either disks within the right disk-handling station 38 or left disk-handling station 39 simply by moving mirror slider 176.

While the above discussion describes the use of a sliding mechanism having two mirrors to direct the laser beams between the two disk-handling stations 38, 39, a single pivoting mirror could alternately be used for this purpose.

The operation of right disk-handling station 38, which has been described in some detail above, may be considered to consist basically of disk-movement cycles alternating with texturing cycles, wherein each disk movement cycle consists of the movement of one or two disks by pick-and-place mechanism 71, and wherein each texturing cycle consists of the movement of a single disk on the spindle 86. Whenever sufficient disks are available for texturing to allow the disk texturing tool 37 to operate at full capacity, each disk-movement cycle of right disk-handling station 38 occurs simultaneously with a texturing cycle of left disk-handling station 39, and each disk-movement cycle of left disk-handling station 39 occurs simultaneously with a texturing cycle of right disk-handling station 38. In this way, the use of the texturing process available through operation of infrared laser 108 is maximized, along with the overall process speed of the laser texturing tool 37. However, when disks to be textured are not available from one of the disk-handling stations 38, 39, the other disk handling station can continue to run at its full speed.

Referring to FIGS. 5–7, a preferred version of the present invention includes a bar code scanner 186 for reading bar code labels (not shown) placed on a side of a cassette 48, which is put on platform 54. To use this feature, the computing unit 70 executes a program relating bar codes read by scanner 186. Data gathered by reading bar code labels may be stored and used by an inventory control system to keep track of work in process.

The present invention provides advantages of optimized productivity and flexibility. In a preferred mode of operation, both disk-handling stations 38, 39 are simultaneously used as described above, maximizing the rate of production for the laser texturing tool 37. The use of laser 108 is optimized, with various disk-handling processes in each disk-handling station 38, 39 occurring while a disk 49, 172 in the other disk-handling station is being exposed to the laser. The use of separate disk-handling stations also provides flexibility; if either of the disk-handling stations 38, 39 is disabled, production can continue at a reduced rate using the other disk-handling station. A single disk-handling station 38, 39 can also be used, if desired, when untextured disks sufficient for the use of both stations are not available for the process.

Referring again to FIGS. 5 and 5B the preceding discussion has described a method for texturing disks using a laser beam system which has been manually adjusted to provide a certain overall power at a single beam 135 and for balancing the two beams 136m resulting from splitting the single beam 135. The laser beam system may alternately be set up by providing more laser power than necessary in the single beam 135 and by subsequently adjusting each beam 136m to a level defined by a set point, so that each beam 136m is attenuated during the adjustment process by the corresponding liquid crystal variable retarder 136b.

Furthermore, a preferred version of the present invention includes automatic means for initially making the laser power adjustments and for maintaining these adjustments.

Figure 10:
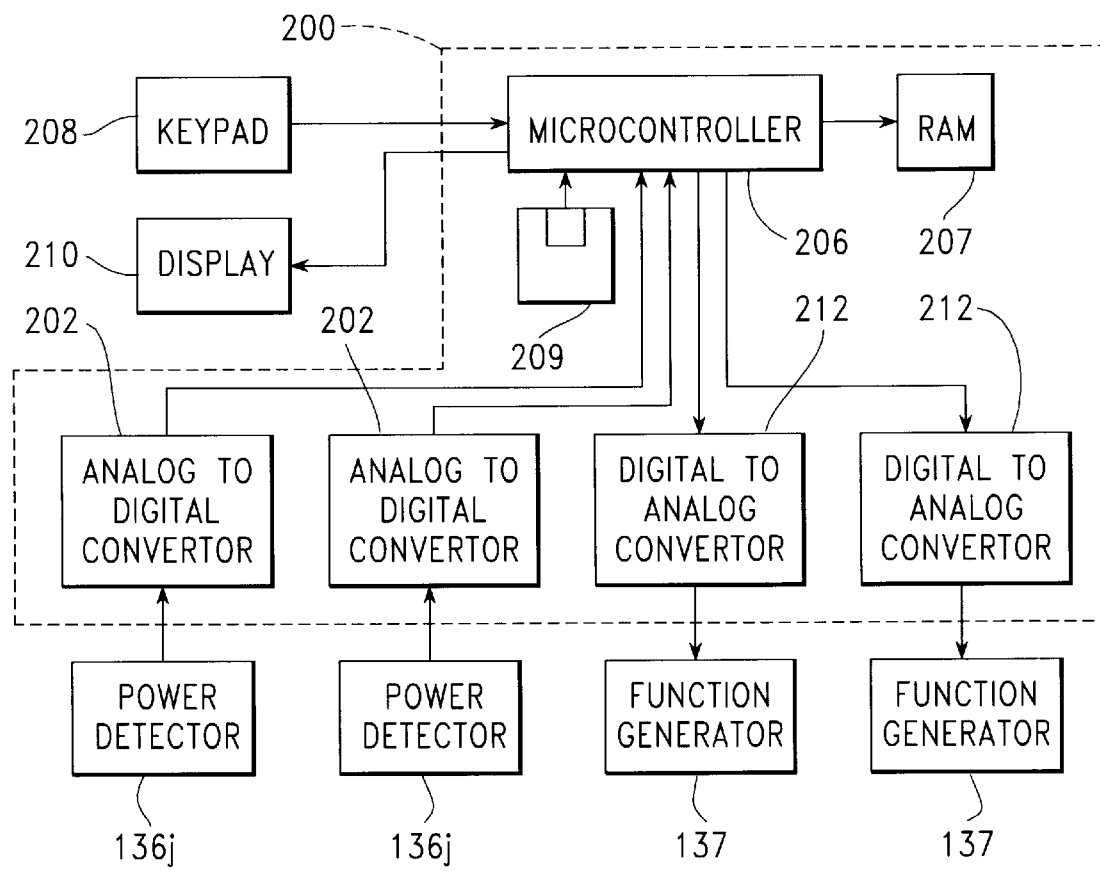
FIG. 10 is a block diagram of electronic apparatus for controlling the power level within laser beams within the tool of FIG. 4.

FIG. 10 is a block diagram of a subsystem 200 for adjusting and maintaining the power in a laser single beam 136m at a set-point level. Referring to FIGS. 5B and 10, inputs to the subsystem 200 are provided by the outputs of a laser power detectors 136j, which have previously been discussed in reference to FIG. 5B, each of which measures the power of a single beam 136m. The output of each detector 136j is fed into an analog to digital convertor 202, and the outputs of the two convertors 202 are individually provided as 12-bit inputs to ports of a microcontroller 206. Program and data information is stored in a random access memory 207 of the microcontroller 206. Operator inputs to the microcontroller 206 are provided through a keypad 208, while program information is typically loaded into the microcontroller 206 through a magnetic diskette 209. A display unit 210 is also connected to receive outputs from the microcontroller 206. Two output ports of the micro controller 206 are individually connected to digital to analog convertors 212. The output of each digital to analog convertor 212 drives an input of a function generator 137, which in turn produces a 2 KHz square wave function having a voltage determined by the output voltage of the attached digital to analog convertor 212. As previously described in reference to FIG. 5B, each function generator 137 drives a liquid crystal variable retarder 136b, which variably attenuates the power level of an associated laser beam 136m.

Figure 11:
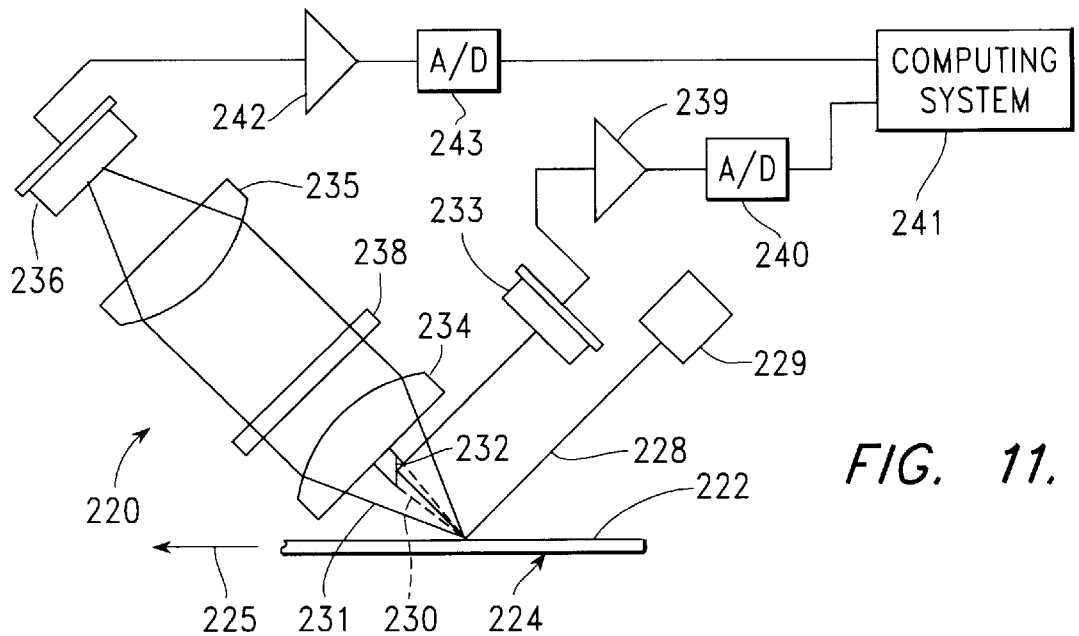
FIG. 11 is a partly schematic elevational view of inspection apparatus built in accordance with a first embodiment of the present invention.

FIG. 11 is a partly schematic elevational view of optical apparatus 220 for measuring a textured surface within a first embodiment of the present invention. A textured surface 222 of a disk 224 is driven in the direction of arrow 225 past a spot 226 at which a light beam 228 from a laser diode 229 strikes the surface 222. If the textured surface 222 is, for example, an annular portion of the disk surface, centered about an axis of rotation for the disk, this type of movement may be achieved by rotating the disk about its axis of rotation.

In the textured area 222, the surface of disk 224 is partly flat and smooth, or specular, reflecting light from the laser beam 228 within an inner cone 230. Due to the process of texturing, other portions of the textured area 222 lie at various angles, so that the light reflected from the laser beam is scattered, being reflected at directions outside the inner cone 230 but within an outer cone 231. Thus, light reflected within the inner cone 230 is directed by a reflector 232 to a specular reflection sensor 233. Reflected light falling outside the inner cone 230 but within the outer cone 231 is collimated by an objective lens 234, and is focussed by a focussing lens 235 on a scattered reflection sensor 236. If the apparatus 220 is placed within an area having significant ambient light, such as within the laser texturing tool 37, where a pulsed laser 108 (shown in FIG. 5) is being used to texture disk surfaces, a filter 238 may be placed in the optical path to the scattered reflection sensor 236, substantially reducing the transmission of light not having the wavelength of the inspection laser beam 228.

Each photodetector 233, 236 has a single photosensitive element, which produces a single output signal. The output signal from first photodetector 233 is provided as an input through an amplifier 239 and an analog-to-digital convertor 240 to a first port of a computing system 241. The output signal from scattered reflection sensor 236 is provided as an input through an amplifier 242 and an analog-to-digital convertor 243 to a second port of computing system 241.

The computing system 241 executes a program to determine whether the optical apparatus 220 is operating properly and whether the disk 224 is being textured, based on whether the output signals from photodetectors 229 and 236 are above predetermined threshold levels. If the output signals of both photodetectors 229 and 236 are above these threshold levels, the status of both the texturing process and the inspection device are determined to be all right. If the output of the specular reflection sensor 229 is above its threshold level, while the output of the second photodetector 236 is below its threshold level the texturing process is determined to be defective, since texturing is not being adequately being detected by the apparatus 220. If the output of the specular reflection sensor 229 is below its threshold level, while the output of the scattered reflection sensor is above its threshold level, optical apparatus 220 is determined to be out of optical alignment, with some of the light reflected within inner cone 230 apparently not reaching the specular reflection sensor 229, but a determination concerning the status of the texturing process cannot be made. If both the outputs of first photodetector 229 and scattered reflection sensor 236 are below their respective threshold levels, a failure condition of the optical apparatus 220 is detected, being possibly due to the absence of a disk 224 within the apparatus 220 or due to a failure of the laser diode 229. The results of these comparisons are shown in a display screen (not shown) connected to computing system 241. Other means for reporting the data being developed, such as an audible alarm indicating the detection of a failure condition, may also be used.

The optical apparatus 230 may be part of an inspection device external to the laser texturing station 37 (shown in FIG. 5), or this apparatus 230 may be installed within the station 37, monitoring the texturing process as it is applied to an individual disk 49 on spindle 86 (also shown in FIG. 5). If the optical apparatus 230 is part of the laser texturing station 37, the computing system 241 may be a separate computing system, used only for this inspection process, or the computing system 241 may be the microcontroller 206, with two ports thereof being used for the outputs of analog-to-digital convertors 240, 243, and with a program to make the output comparisons described above running along with other programs controlling operation of the station 37.

Figure 12:
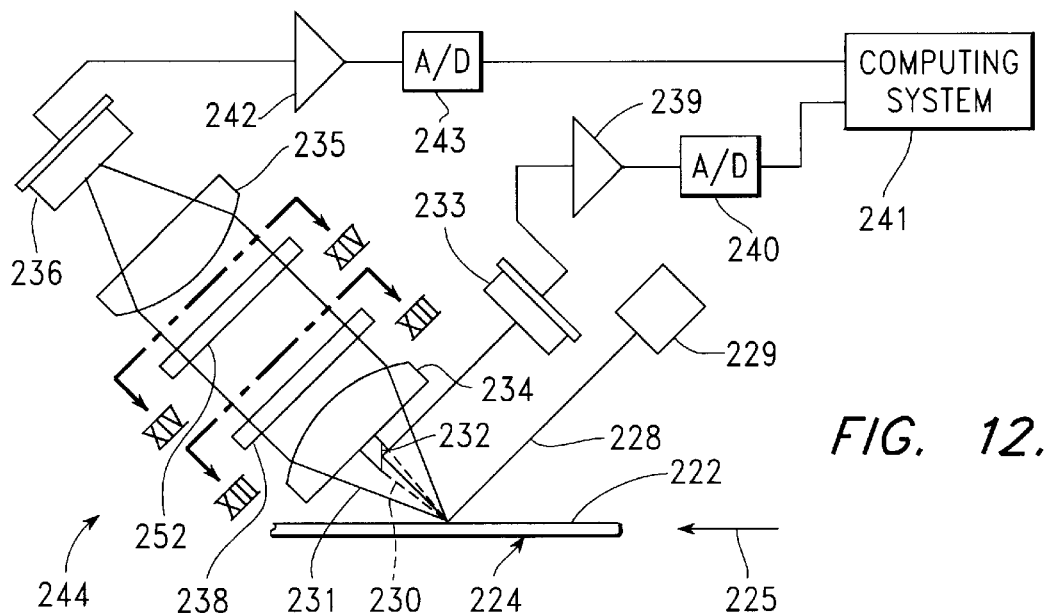
FIG. 12 is a partly schematic elevational view of inspection apparatus built in accordance with a second embodiment of the present invention.

FIG. 12 is a partly schematic elevational view of optical apparatus 244 for measuring a textured surface within a second embodiment of the present invention. This apparatus 244 includes a number of elements which are similar or identical in configuration and function with corresponding elements of the apparatus 220 of FIG. 11, and which are therefore accorded like reference numerals.

The apparatus 244 is particularly useful in the inspection of surface texturing occurring in a geometrically repeatable fashion, with individual texture elements, such as depressions and ridges, being round and symmetrical, so that the reflection of laser beam 228 from the textured surface produces a pattern of lights within a repeatable and stable pattern of diffraction rings. An example of such a surface is the disk surface textured according to the process described above in reference to FIG. 5. When such a surface is illuminated in the manner of FIG. 12, the collimated light travelling between the objective lens 234 and the focussing lens 235 appears as a pattern of lights within a number of diffraction rings.

Figure 13:
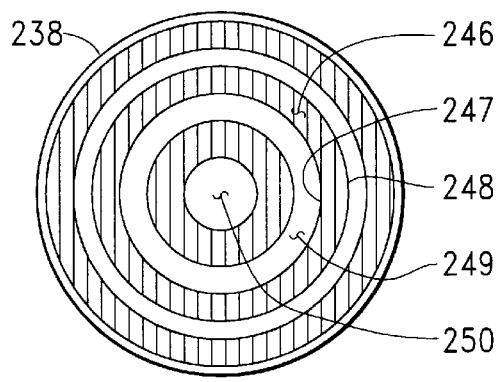
FIG. 13 is a transverse cross-sectional view of the apparatus of FIG. 12, taken as indicated by section lines XIII—XIII therein to show the formation of diffraction rings.

FIG. 13 is a transverse sectional view through the optical apparatus 244, taken as shown by section lines XIII—XIII in FIG. 12 to indicate, with vertical shading, the diffraction rings 246 within which patterns of lights are transmitted. Each diffraction ring 246 has an annular section mid-way between its inner circle 247 and its outer circle 248, having its highest light density, with the light density being decreased as the inner circle 247 or the outer circle 248 is approached. The various diffraction rings 246 are separated by dark rings 249. The central portion 250 is dark because light which would otherwise be present in this area is blocked by the reflector 232 (shown in FIG. 12).

Figure 14:
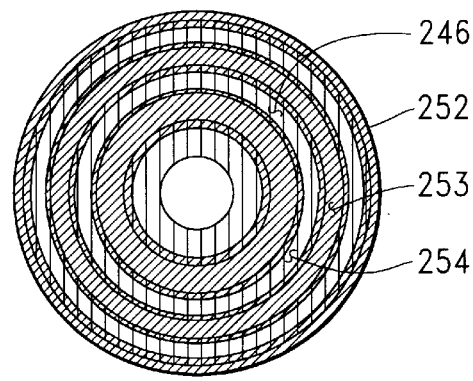
FIG. 14 is a transverse cross-sectional view of the apparatus of FIG. 12, taken as indicated by section lines XIV—XIV therein to show a mask pattern.

FIG. 14 is a transverse sectional view through the optical apparatus 244, taken as shown by section lines XIV—XIV in FIG.12 to show a masking pattern on a mask plate 252. The darkened (opaque) areas 253, indicated by oblique shading, block the transmission of light, while the clear areas 254 therebetween allow the transmission of light.

Referring to FIGS. 12–14, the light from laser beam 228 reflected off flat, microscopically untextured surfaces of the disk 224 within inner cone 230 is again reflected into a specular reflection sensor 233 by means of a central reflector 232. The reflections scattered due to surface texturing are again directed through an objective lens 234 and a focussing lens 235 to a scattered reflection sensor 236. However, in the example of FIG. 12, the density of light entering scattered reflection sensor 236 is not determined solely by the percentage of the laser beam 228 which is scattered by reflection at the surface 222, but rather on the relationship between the light pattern of the diffraction rings 246 and the darkened mask areas 253. In this regard, mask areas 253 are placed between the expected locations at which diffraction rings 246 are formed by a textured surface 222 formed under predetermined ideal conditions. A change in the texture of surface 222 from this ideal surface results in a change in the diffraction rings 253, which is typically seen as an enlargement or reduction in size of the diffraction rings 253. In either case, such a change results in a reduction of the light passing through the mask plate 253, since a portion of each diffraction ring is driven inward or outward to be blocked by an adjacent mask area 253.

In this configuration, the output of specular reflection sensor 233 is used to compensate for changes in the light output of laser diode 229. As before, this output is provided as an input to computing system 241 through amplifier 239 and analog to digital convertor 240. The output of scattered reflection sensor 236 is provided as another input to computing system 241 through amplifier 242 and analog to digital convertor 243. The computing system 241 processes the data received from analog to digital convertors 240, 243 so that an inspection function derived from the output of scattered reflection sensor 236 is compensated for variations in the output of specular reflection sensor 233. For example, this inspection function may reflect the percentage of light from the laser diode 229 passing through the mask plate 252, with the inspection function being derived by dividing the output level of scattered reflection sensor 236 by the output level of specular reflection sensor 233.

The optical apparatus 244 may be part of an inspection device external to the laser texturing station 37 (shown in FIG. 5), or part of the laser texturing station. The computer system 241 may be a separate computer system dedicated to the inspection process, or it may be a computer system also providing various functions relative to the control of the laser texturing process in the station 37. The inspection function calculated as described in the preceding paragraph may be used as a feedback signal controlling the texturing process to produce a uniformly textured surface.

Figure 15:
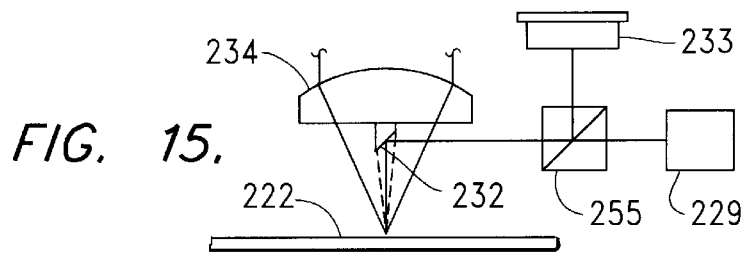
FIG. 15 is a fractional elevational view of an alternative version of the apparatus of FIG. 11 or FIG. 12.

FIG. 15 is a fragmentary elevational view of an alternative version of either of the embodiments of FIGS. 11 and 12. In the example of FIG. 15, the output of laser 229 is fed through a beamsplitter 255 to reflect off the central reflector 232. In this way, the laser beam is perpendicularly incident on the textured disk surface 222. The specular reflection off flat portions of the surface 222 reflects perpendicularly from the surface 222, being directed to the specular reflection sensor 233 through the central reflector 232 and the beamsplitter 255. Operation of this version is otherwise as described above in reference to FIGS. 11 and 12.

Figure 16:
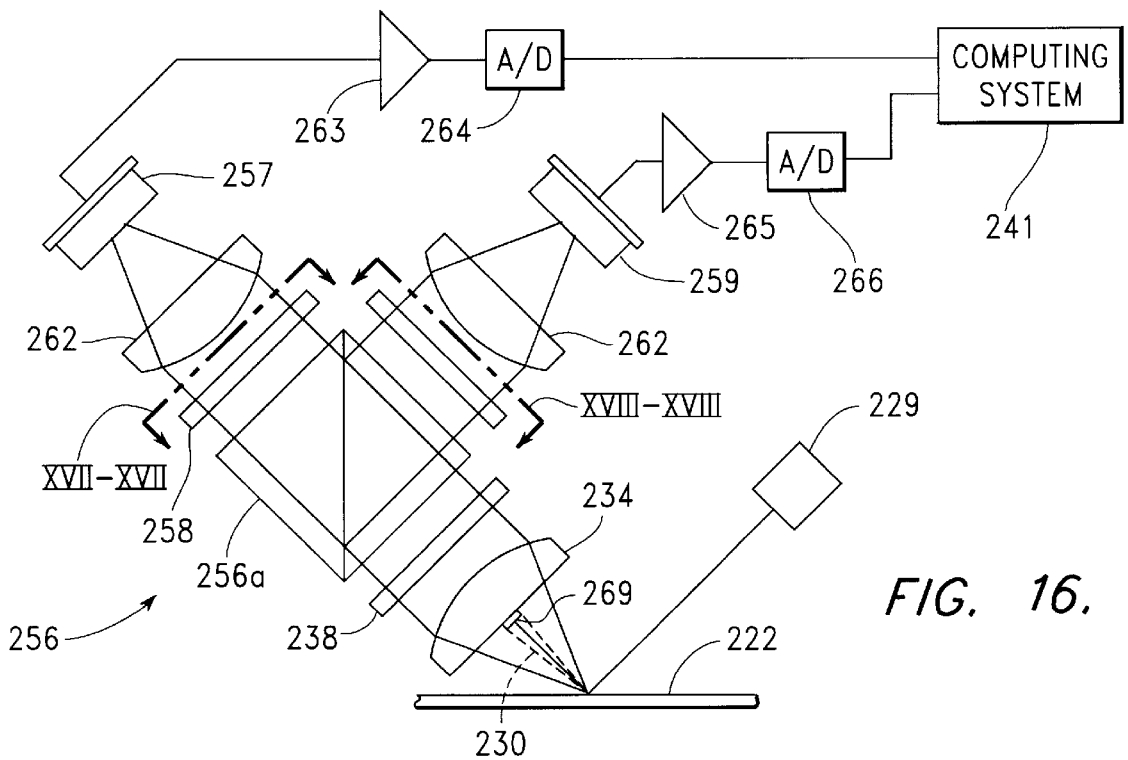
FIG. 16 is a partly schematic elevational view of inspection apparatus built in accordance with a third embodiment of the present invention.

FIG. 16 is a partly schematic elevational view of optical apparatus 256 for measuring a textured surface within a third embodiment of the present invention. This apparatus 256 also includes a number of elements which are similar or identical in configuration and function with corresponding element os the apparatus 220 of FIG. 11, and which are therefore accorded like reference numerals.

Like the apparatus of FIG. 12, the apparatus of FIG. 16 is particularly useful in the inspection of a surface textured in a geometrically repeatable fashion with symmetrical, round surface features, so that an ideal surface produces a repeatable and stable pattern of concentric diffraction rings 246 as discussed above in reference to FIG. 13. However, the apparatus of FIG. 16 is additionally configured to provide an indication, not only that the diffraction rings 246 projected from objective lens 234 have varied from a predetermined ideal location for such rings, but also to indicate the direction in which this variation has occurred, i.e. whether the rings 246 are larger or smaller than the predetermined ideal rings.

To this end, the projected light pattern from objective lens 234, which has been described above in reference to FIG. 13, is divided within a beamsplitter 256a to be directed simultaneously to a first scattered reflection sensor 257 through a first mask plate 258 and to a second scattered reflection sensor 259 through a second mask plate 260. Light is focussed on these scattered reflection sensors 257, 259 through similar focussing lenses 262. The output of first scattered reflection sensor 257 is provided as a first input to computing system 241 through an amplifier 263 and an analog-to-digital convertor 264, while the output of second scattered reflection sensor 259 is provided as a second input to computing system 241 through an amplifier 265 and an analog-to-digital convertor 266.

Figures 17, 18:
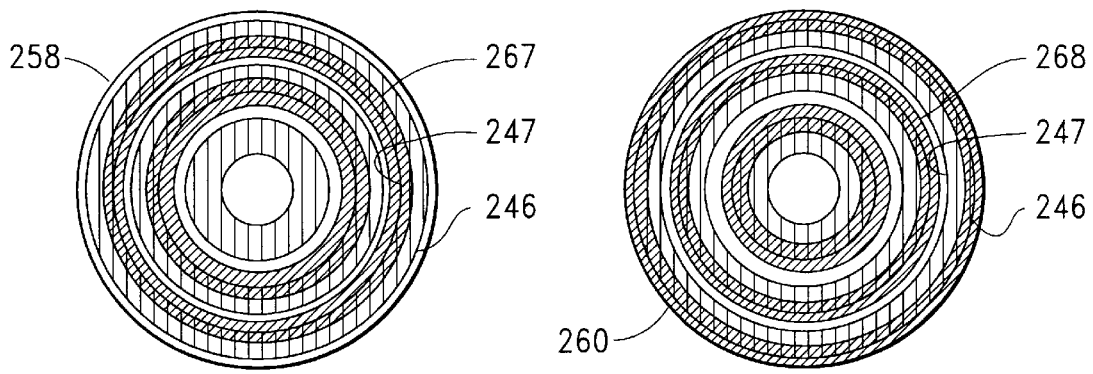
FIG. 17 is a transverse cross-sectional view of the apparatus of FIG. 16, taken as indicated by section lines XVII—XVII therein to show a first mask pattern.
FIG. 18 is a transverse cross-sectional view of the apparatus of FIG. 16, taken as indicated by section lines XVIIi—XVIIi therein to show a second mask pattern.

FIG. 17 is a transverse sectional view of the optical apparatus 256, taken as indicated by section lines XVII—XVII to show the mask pattern of first mask plate 258. Each opaque ring 267 extends inward from the inner circle 247 of a diffraction ring 246 formed with a textured surface 222 textured under ideal conditions. Thus, when the diameter of the actual diffraction ring 246 is decreased, the light level measured by first scattered reflection sensor 257 is decreased, as an additional portion of the diffraction ring 248 moves under the inwardly adjacent opaque ring 267. Conversely, when the diameter of the actual diffraction ring 246 is increased, the light level measured by first scattered reflection sensor 257 is increased, as an additional portion of the diffraction ring 246 moves outward from the inwardly adjacent opaque ring 267.

FIG. 18 is a transverse sectional view of the optical apparatus 256, taken as indicated by section lines XVII—XVII to show the mask pattern of second mask plate 260. Each opaque ring 268 extends outward from the outer circle 248 of a diffraction ring 246 formed with a textured surface 222 textured under ideal conditions. Thus, when the diameter of the actual diffraction ring 246 is decreased, the light level measured by first scattered reflection sensor 257 is increased, as an additional portion of the diffraction ring 246 moves inward from under the outwardly adjacent opaque ring 268. Conversely, when the diameter of the actual diffraction ring 246 is increased, the light level measured by first scattered reflection sensor 257 is decreased, as an additional portion of the diffraction ring 246 moves outward under the outwardly adjacent opaque ring 268.

Referring to FIGS. 16–18, while the output signals from the scattered reflection sensors 257, 259 vary in opposite directions with increases and decreases in the diameters of diffraction rings 246, these signals are similarly affected by changes in the laser power level of laser diode 229. Therefore, a specular reflection sensor 229, which has been described in reference to FIGS. 11 and 12, is not required in the embodiment of FIG. 18. An opaque masking circle 269 is applied to the center of objective lens 234, so that the relatively bright specular reflections within the inner cone 230 do not enter the optical system, beginning with the objective lens 234, in which relatively low levels of scattered reflected light are measured.

Within the computing system 241, an inspection function is developed in response to the outputs of analog-to-digital convertors 264, 266. To maximize the effects of changes in the diameter of diffraction rings, this inspection function is derived by dividing the difference between the outputs of analog-to-digital convertors 264, 266 by the sum of these outputs.

The optical system 256 may be part of the laser texturing station 37 (shown in FIG. 5) or it may be within a separate disk inspection station. The computing system 241 may be a separate system devoted to the inspection process, or the program developing the inspection function may be running along with routines controlling the texturing process. The inspection function may be used as a feedback signal in controlling the texturing process.

Figure 19:
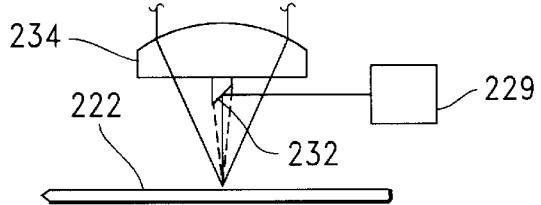
FIG. 19 is a fractional elevational view of an alternative version of the apparatus of FIG. 16.

FIG. 19 is a fragmentary elevational view of an alternate version of the optical apparatus of the third embodiment of the present invention. In this version, the central reflector 232 is retained, being used to reflect a laser beam from laser diode 229 to strike the textured surface 222 perpendicularly. Otherwise, operation of this version is as described above in reference to FIG. 16.

Figure 20:
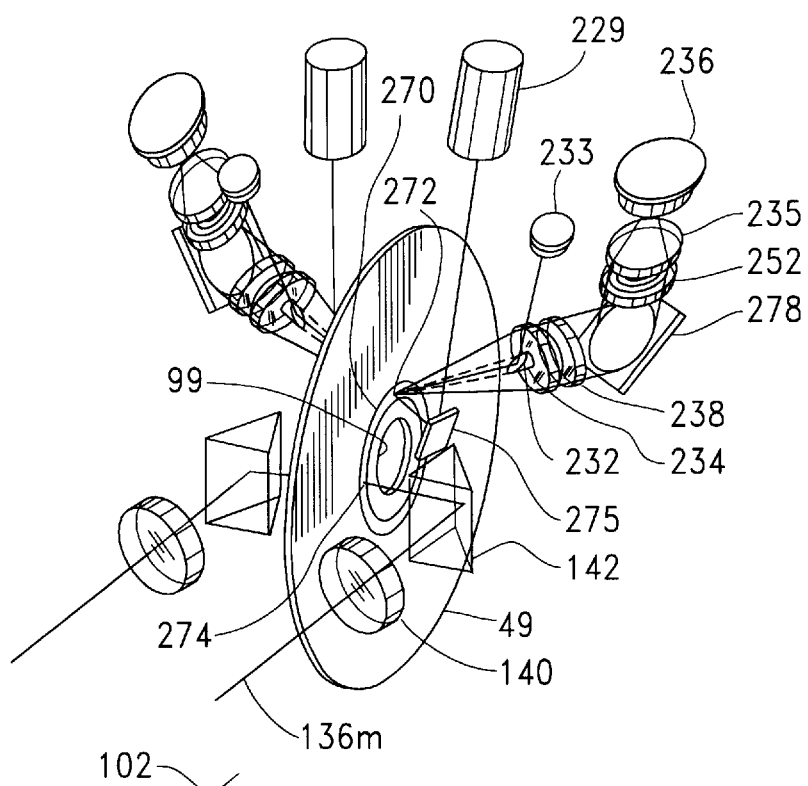
FIG. 20 is a perspective view of inspection apparatus built in accordance with the second embodiment of the present invention installed within the laser disk texturing tool of FIG. 4.

FIG. 20 is a perspective view of optical elements showing the application of the second embodiment of the present invention, which has been described above in reference to FIG. 16, within the laser texturing station 37 (shown in FIG. 5). Texturing occurs on each side of the disk 49 within a band 270, which is, for example, 3 mm wide, as the disk 49 is rotated about its central hole 99, and as it is translated in the direction of arrow 102. The texturing laser 136*m* is directed at each side of the disk 49 through a lens 140 and a prism 142.

The inspection process is carried out as described above in reference to FIG. 16, with a laser beam 228 from a laser diode 229 being aimed at a spot 272 approximately ninety degrees around each side of the disk 49 from the spot 274 at which the texturing beam 136*m* is aimed. A first optical path folding mirror 275 is added to the light path of the laser beam 228 so that the laser diode 229 may be located at a convenient position. The laser beam 228 forms an illuminated spot having a diameter of, for example, 1 mm, so that about one third of the width of the textured ring 270 is simultaneously examined. A second optical path folding mirror 276 is placed in the optical path between each filter 238 and the corresponding mask plate 252. The central reflector 232 aims specular reflection at the specular reflection sensor, while scattered reflection, for example, in the form of diffraction rings passing through the mask plate 252, is focussed on scattered reflection sensor 236 by means of objective lens 234 and focussing lens 235.

Figure 21:
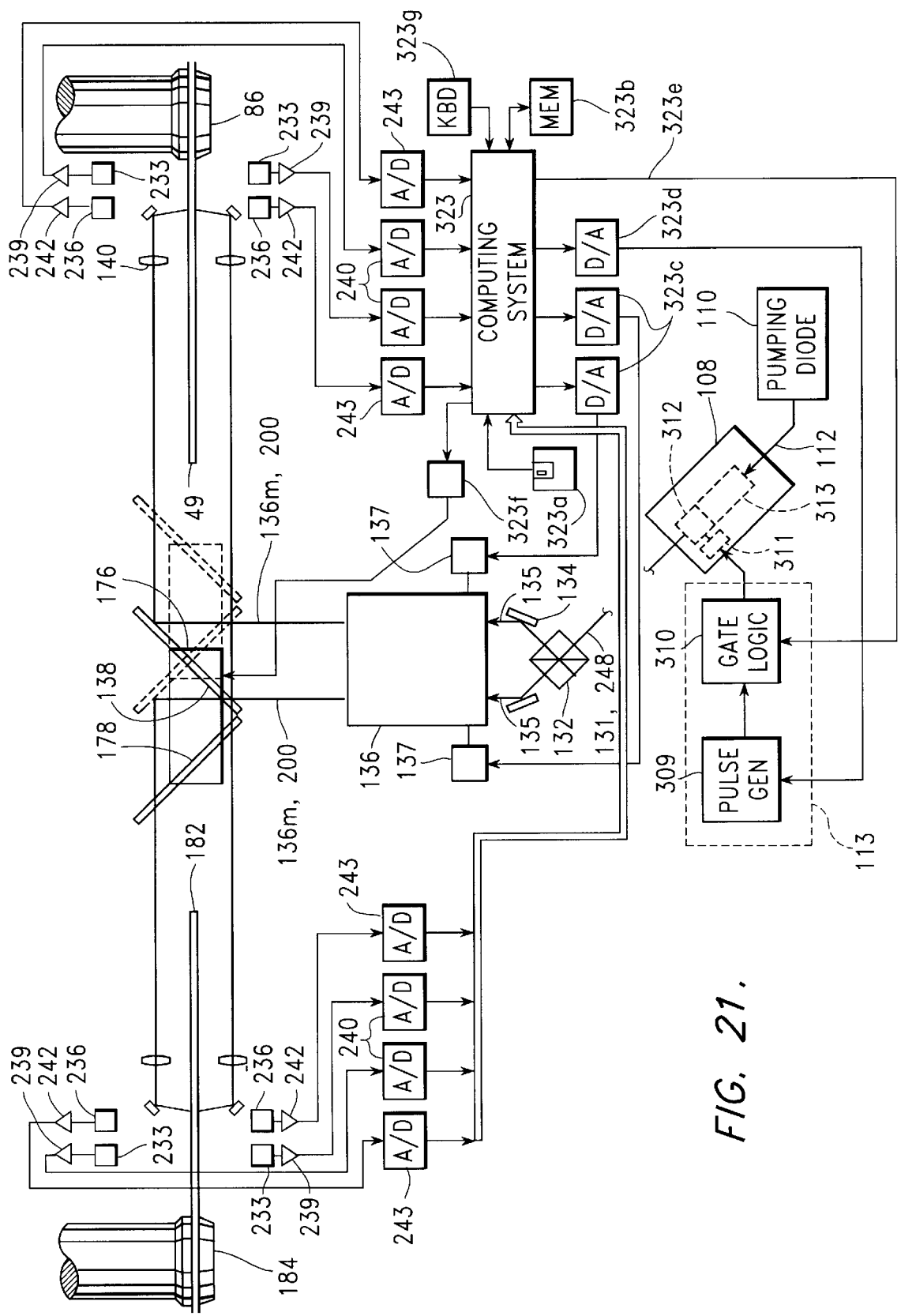
FIG. 21 is a schematic view of control apparatus using the inspection apparatus of FIG. 20 to control operation of a tool texturing both sides of disks on alternate spindles.

FIG. 21 is a partly schematic plan view of an embodiment of the present invention in which output signals from four scattered reflection sensors 236 and four associated specular reflection sensors 233 are used to vary both the levels of texturing laser energy reaching the disks 49 and 182, being textured on spindles 86 and 184, respectively, and to vary the shape of texturing pulses emitted from the texturing laser 108. These sensors 233, 236 are positioned as shown in FIG. 20 to view textured spots on each side of each disk 49, 182.

In the example of FIG. 21, the laser 108 is energized by diode pumping from a laser diode 110 through a fiber-optic cable 112, and is pulsed by a Q-switch control 113 including a pulse generator 309 to generate a square wave corresponding to the desired train of laser beam pulses, and gate logic 310 to determine when laser beam pulses occur. The laser 108 includes an oscillator 311 driving an acousto-optic Q-switch 312, within a laser cavity 313 in the laser 108, with a radio-frequency signal. When the Q-switch 310 is acoustically activated by this radio-frequency signal, it spoils the Q-factor of the laser cavity 313, stopping the emission of a laser beam. When the radio-frequency energy is turned off for a relatively short time, the laser is permitted to emit a laser beam pulse. In a typical production mode, the frequency of pulse generator 309 is set at 100 KHz, producing a pulse every 10 microseconds, while the oscillator 311 produces a radio-frequency wave at 80 MHz.

The level of power which may be delivered from pumping diode 110 depends on the type of laser 108 employed within the system. For example, one type of laser 108 uses up to 3 watts of power from pumping diode 110, while another type of laser 108 uses as much as 30 watts. Furthermore, the use of a different laser configuration suggests the use of different frequencies, with the pulse generator 309 operating, for example, at 70 KHz.

In the context of the disk texturing process described herein, it is desirable to be able to vary the shape of each laser beam pulse within a train of such pulses. For example, in the production of textured spots of the type shown in FIG. 3, a longer pulse width (or greater pulse duration) tends to produce a higher rim 282 around the textured area, together with a lower central area within the rim 282. However, if a conventional means of varying the repetition rate (i.e. changing the frequency of the square wave pulses from pulse generator 309) is used, any attempt to change the wave shape also results in a change in the time between pulses, and, therefore, in a variation in the distance between textured spots on the disk. An attempt to correct this may result in further changes to spot size and in an unsatisfactory variation in the time required to complete the process of texturing a single disk. To overcome such difficulties, pulse generator 309 is configured to have a variable duty cycle.

Figure 22:
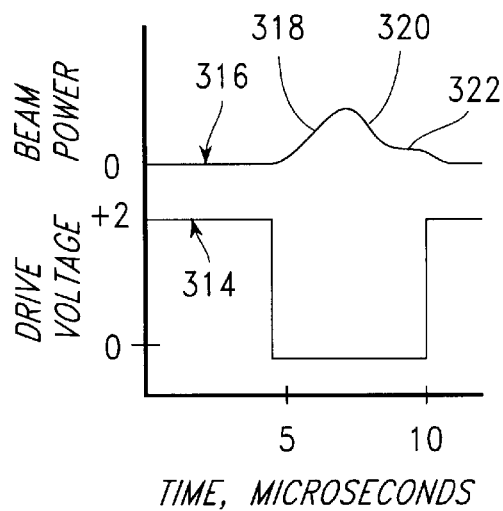
FIG. 22 is a graphical view of a pulse emitted by the pulsed laser within the texturing apparatus of FIG. 21, at a repetition rate of one pulse per 10 microseconds with a radio frequency signal being driven into a Q-switch in the laser for 4.5 microseconds between pulses.
Figure 23:
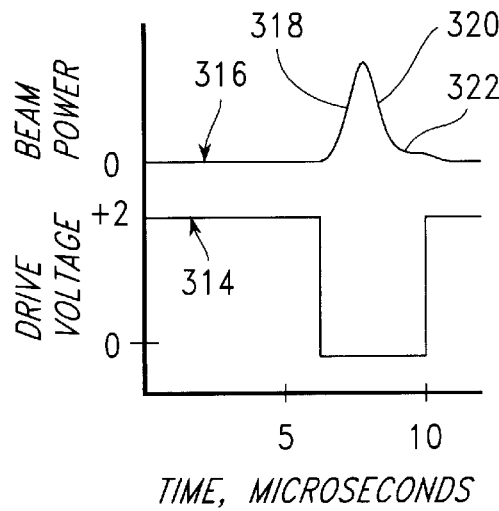
FIG. 23 is a graphical view similar to FIG. 22, except that the radio frequency signal is driven for 6.0 milliseconds between pulses.
Figure 24:
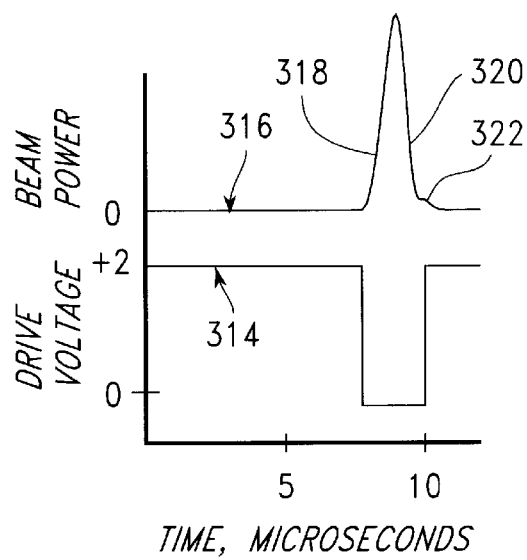
FIG. 24 is a graphical view similar to FIG. 22, except that the radio frequency signal is driven for 7.5 milliseconds between pulses.

FIGS. 22–24 are graphical views showing the effects of variations in the duty cycle of the signal driving the oscillator 311 on the shape of the laser pulse emitted. In each of these FIGS., a lower curve 314 represents a drive voltage applied from the pulse generator 309, through gate logic 310, as an input to oscillator 311. In the example of these FIGS. 22–24, when two volts is applied in this way, the oscillator 311 drives Q-switch 312 with radio-frequency energy, preventing the emission of a laser beam pulse, as shown in the upper laser beam power curve 316. Each FIG. 20–22 shows a 10-microsecond single pulse in a train of pulses generated at 100 KHz. In FIG. 22, the duty cycle (the ratio of time Q-switch 312 is driven with a radio-frequency signal divided by the total time of a cycle) is 45 percent. In FIG. 23, the duty cycle is 60 percent. In FIG. 24, the duty cycle is 75 percent.

In each FIG. 22–24, when the drive voltage is dropped, the laser output power rises rapidly along an initial curve portion 318 to a maximum level, and then falls along a second curve portion 320 to a much lower level at third curve portion 322, which continues until the drive voltage is restored. During the portion of each cycle preceding the laser pulse, energy is accumulated, with more energy being accumulated as a longer time is allowed for this purpose. Both the steepness of the subsequent rise in laser output power and the level to which this power rises are increased with the increased stored energy of pulses having higher duty cycles.

Thus, through the use of a pulse generator 309 having a variable duty cycle, an ability is gained to change the height and width of individual laser beam pulses, without changing the repetition rate of such pulses. This feature is especially useful in a texturing system used to texture disks formed with different materials or to texture disks according to multiple requirements.

Referring again to FIG. 21, the control of various texturing parameters is achieved through the use of a computing system 323, which includes a provision for reading program information stored on disks 323*a* and a memory 323*b*. The memory 323*b* may include, for example, random access system memory and hardfile storage. The outputs of the computing system 323 are used to drive various systems to establish operating conditions for the texturing process. For example, an input signal to each function generator 137, which controls the level at which a corresponding input beam 135 is attenuated within the power control optics block 136, is sent from the computing system 123 through a digital-to-analog convertor 323*c*. An input signal to the pulse generator 309, controlling the duty cycle of this generator 309 to effect changes in the shape of the laser beam pulses from texturing laser 108 is sent from the computing system 123 through a digital-to-analog convertor 323*d*. The computing system 323 also performs various sequencing functions, with an output signal on line 323*e* to gate logic 310 being used to turn the pulses from texturing laser 108 on through Q-switch 312 only when they are needed for texturing, and with an output signal to a solenoid valve 323*f* being used to control the position of shuttling mirrors 138, 178 through pneumatic slider 176.

Of the exemplary parameters controlled in this way, the pulse shape is applied simultaneously to each side of whichever disk 49 or 182 is being textured at a time. However, a different pulse shape may be applied to the disks 49 and 182 from opposite sides of the laser station. This kind of flexibility is particularly desirable in the event that different types of disks are to be textured on the two spindles 86, 184, or if disks from these spindles are otherwise to be textured according to differing specifications. In certain instances, the ability to texture disks according to differing specifications allows the laser texturing process to be used at a full rate of production when a limited number of disks textured to one of the specifications is required.

On the other hand, the laser power parameter is independently applied to each side of the disk 49 or 182 being textured, providing a type of control which is particularly important because of differences between the two beams 135 arising from beam splitter 132 at the beginning of the different optical paths extending to the sides of the disk being textured. This independence of control of the laser power attenuation arises from the fact that the liquid crystal variable retarders 136*b* (shown in FIG. 5B) within power control optics block 137 are independently driven by a pair of function generators 137 receiving input signals from computing system 323 through digital-to-analog converters 323*c*. Furthermore, these function generators 137 are preferably driven at independently adjustable levels according to the spindle 86 or 184 holding the disk currently being textured. This type of independent adjustment provides compensation for differences in the efficiency of transmitting laser beams along the optical paths leading to the disks on the different spindles 86, 184. This type of independent adjustment can also be used to facilitate texturing disks to differing specifications on the two spindles.

Thus, the computing system 323 stores, within memory 323*b*, independent levels for one or more parameters to be applied to disks being textured on the spindles 86 and 184. Since the computing system 323 controls the position of shuttling mirrors 138, 178 through solenoid valve assembly 323*f*, the location of the shuttling mirror is known within the system 323. This information is used to determine which of the two levels for each parameter to apply for the texturing of an individual disk.

Continuing to refer to FIG. 21, and referring additionally to FIG. 20, in accordance with the present invention, data representative of textured surfaces on each side of the disks 49, 182 is generated from signals provided by the sensors 233, 236. The output of each specular reflection sensor 233 is fed through an amplifier 239 and an analog-to-digital convertor 240 into the computing system 323. The output of each scattered reflection sensor 236 is fed through an amplifier 242 and an analog-to-digital convertor 243 into the computing system 323. In the computing system 323, a program performing calculations to determine various parameters relating to the profiles of textured spots. This program has been loaded into the computing system 323 by means of one or more diskettes 323*a*, on which the program is magnetically recorded. These calculations develop profile data for textured spots, on each side of each of the disks 49,182, based on the output signals derived from the sensors 233, 236.

In general, to generate data describing the entire texturing process, the computing system 323 tracks four separate texturing profiles, one for each of the two sides of the disks 49 being textured on right spindle 86 and one for each of the two sides of the disks being textured on left spindle 184. To facilitate these calculations, the computing system 323 may be operated in a multitasking mode. However, since the disks on spindles 86,184 are textured in an alternating fashion, the calculations performed with profile data from these disks are also performed in alternating fashion, reducing the processing load placed on the computing system 323.

Data collected this way may be displayed on a conventional display unit (not shown), providing inputs to a process in which calculations are made as described above for adjusting one or more parameters in the texturing process. Separate data is used for each side of each disk 49,182.

Moreover, in a preferred version of this invention, this data is used to control various parameters of the texturing process on a real-time basis. For example, an output from computing system 323 through a digital-to-analog convertor 323d is varied to control the duty cycle of pulse generator 309. Another output from computing system 323 to gate logic 310, on line 323e, is used to turn the laser pulses on only when they are needed for the texturing process. Outputs of the computing system 323 through digital-to-analog convertors 323c are used to adjust the operating levels of the corresponding liquid crystal variable retarders 136b (shown in FIG. 5B) by controlling the voltage output of an associated function generators 137. It is understood that, while these process controls are considered exemplary, a number of other controls over the texturing process may be varied through the use of the output signals from sensors 233, 236 and the computing system 323.

Despite the fact that changes are being made on the process texturing a disk in a real time basis, separate files are preferably kept within memory 323b for the application of the texturing process to disks on right spindle 86 and on left spindle 184. Thus, the parameters determined to be correct by the end of the process of texturing a disk on right spindle 86 may be used to begin the process of texturing the next disk on right spindle 86, while the parameters determined to be correct by the end of the process of texturing a disk on left spindle 184 is used to begin the process of texturing the next disk on this spindle 184. Since the spindles 86, 184 are used in an alternating fashion, the values of these parameters for a disk on each spindle must be stored as a disk is textured on the other spindle. Furthermore, the use of separate files for processing disks on each spindle allows the storage of different ideal and initial values for parameters, so that disks of differing materials, or disks to be textured to differing specifications may be processed on the two spindles 86, 184.

While the above discussion in reference to FIG. 19 has described the use of beam angle detectors 144, as described in reference FIG. 10, the use, with a computing system, of alternate forms of beam angle detectors, such as those described in reference to FIGS. 17 and 18, are understood to be within the scope of the present invention.

Figure 25:
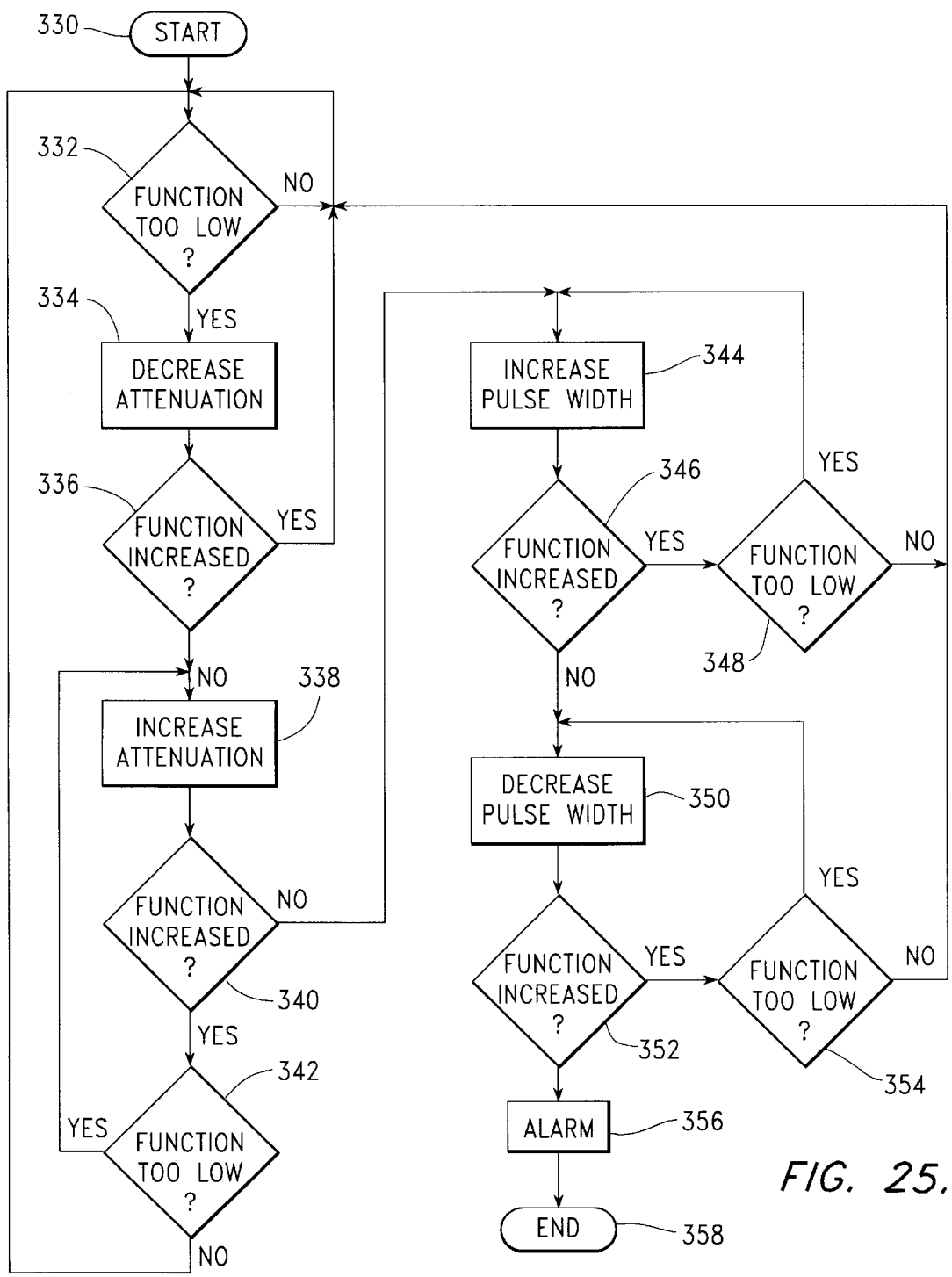
FIG. 25 is a flow chart describing operation of a routine in a computer processor within the apparatus of FIG. 21.

FIG. 25 is a flow chart of an exemplary routine, which may be executed in the computing system 323 (shown in FIG. 24) for varying texturing parameters associated with the process of texturing one side of a disk within the apparatus of the present invention. The parameters to be controlled are the attenuation of the texturing laser beam, through the operation of a liquid crystal variable retarder 136b (shown in FIG. 5B), and the width of texturing pulses, which is adjusted as described above in reference to FIGS. 22–24.

After this routine starts in block 330, a determination is made in block 332 of whether the inspection function is too low. When this program is operated with the second embodiment of the present invention, which is discussed above in reference to FIG. 12, the inspection function is calculated to be proportional to the output signal from scattered reflection sensor 236 divided by the output signal from specular reflection sensor 233. When this inspection function is not too low, it is determined that satisfactory operation is occurring, so the texturing process is continued, with the function being checked on a periodic basis. When this inspection function is too low, it is determined that a variation from the predetermined ideal textured surface has occurred, causing a shift in the size of diffraction rings 246 (shown in FIG. 13).

Thus, when the inspection function is too low, a first attempt is made at increasing it by decreasing the texturing beam attenuation through an incremental level in block 334. If this attempt is successful in increasing the inspection function, as determined in block 336, the system returns to block 332 to determine if the problem has been solved. If it has not, the process is repeated until the inspection function is no longer too low. On the other hand, if the inspection function has not increased, as determined in block 336, an attempt to cause an increase is made by increasing the attenuation through an incremental level in block 338. If this attempt is successful in increasing the inspection function, as determined in block 340, a determination is made in block 342 of whether the function is still too low. If it is, the system returns to block 338, increasing the attenuation through another incremental level in a process which is continued until the function is determined not to be not too low in block 242. When such a determination is made, the system returns to block 332.

A determination in block 340 that the inspection function has not increased indicates that neither decreasing nor increasing the attenuation is effective in causing an increase in the inspection function. When this determination is made, the system proceeds to block 344, in which the texturing pulse width is increased in an incremental fashion. If the inspection function is increased in this way, as determined in block 346, a determination is made in block 348 of whether the inspection function is still too low. If it is not, the system returns to the beginning of the process in block 332. If the function is too low, as determined in block 348, the process of increasing the pulse width in an incremental manner is repeated in block 344, until the function is determined not to be too low in block 348. On the other hand, if the inspection function has not increased, as determined in block 346, the pulse width is decreased in an incremental manner in block 350. A determination is then made in block 352 of whether the inspection function has increased. If it has, a further determination is made in block 354 of whether the function is still too low. If it is not, the system returns to block 332; otherwise the process of decreasing the pulse width is repeated in block 350.

A determination in block 352 that the inspection function has not increased indicates that changes made independently to the attenuation and pulse width functions have failed to increase the inspection function. At this point, in block 356 an alarm is indicated, audibly, visibly, or both, so that the system operator can study the problem, and the routine ends in block 358.

The third embodiment of the present invention, which has been discussed in reference to FIG. 16, can also be used to control the texturing process. With this version, the inspection function, which is calculated to be proportional to the difference between the output signals of scattered reflection sensors 257, 262, divided by the sum of these signals, can be high, low, or in an acceptable range. When the inspection function is low, the system executes one version of a routine similar to that of FIG. 25. When the inspection function is high, the system executes another version of a routine similar to that of FIG. 25. Whether the function is high or low is used to determine whether the attenuation or the pulse width control should be applied first, and whether each of these controls should be increased or decreased first.

When the operation of a laser texturing station built in accordance with the second or third embodiment of present invention is compared with that of U.S. Pat. No. 5,539,213, it is seen that the present invention provides the advantage of performing the comparison between the actual diffraction pattern produced and a predetermined ideal diffraction pattern by optical means as light is passed through one or two mask plates. This eliminates a need to perform complex calculations at a high rate of speed. All of the scattered light is directed at a single light-sensitive element in the second embodiment of the present invention, or a two such elements in the third embodiment of the present invention. There is no need to examine the output of a linear photodetector array. Furthermore, the first embodiment of the present invention provides a very simple method for determine whether the texturing process is occurring.

While the invention has been described in a form simultaneously texturing both sides of an individual disk, it is understood that the invention can readily be applied to a system texturing only one side of an individual disk at a time.

While the invention has been described in a particular application for texturing magnetic disks, it is understood that this invention can also be applied to the texturing of other types of substrates.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. Optical apparatus for inspecting texture of a surface, wherein said optical apparatus comprises:

illumination means for aiming a light beam at said surface;

separation means for removing specular reflections of said light beam by said surface from scattered reflections of said light beam by said surface;

a first scattered reflection sensor having a single light-sensitive element; and optical means for integrating said scattered reflections and for focussing said scattered reflections on said single light-sensitive element of said first scattered reflection sensor wherein said illumination means is a laser; wherein said optical apparatus additionally includes a second scattered reflection sensor having a single light-sensitive element, and said optical means includes an objective lens collimating said scattered reflections, a beamsplitter dividing collimated light from said objective lens between a first optical path extending to said first scattered reflection sensor and a second optical path extending to said second scattered reflection sensor, a first focussing lens in said first optical path focussing collimated light from said beamsplitter on said single light-sensitive element of said first scattered reflection sensor, a second focussing lens in said second optical path focussing collimated light from said beamsplitter on said single light-sensitive element of said second scattered reflection sensor, a first mask in said first optical path between said beamsplitter and said first focussing lens, with said first mask including a number of opaque rings configured to attenuate a passage of light within diffraction rings from said beamsplitter to said first focussing lens in accordance with an enlargement of said diffraction rings in comparison to a predetermined diffraction pattern, and a second mask in said second optical path between said beamsplitter and said second focussing lens, with said second mask including a number of opaque rings configured to attenuate a passage of light within diffraction rings from said beamsplitter to said second focussing lens in accordance with a reduction of said diffraction rings in comparison to a predetermined diffraction pattern.

2. The optical apparatus of claim 1, wherein
   said optical apparatus additionally includes a specular reflection sensor having a single light-sensitive element, and
   said separation means directs said specular reflections to said specular reflection sensor.

3. The optical apparatus of claim 1, wherein said optical means includes an objective lens collimating said scattered reflections and a first focussing lens focussing collimated light from said objective lens on said single light-sensitive element of said first scattered reflection sensor.

4. The optical apparatus of claim 3, wherein said optical means additionally includes a mask in an optical path between said objective lens and said first focussing lens, with said mask including a number of opaque rings configured to attenuate a passage of light within diffraction rings from said objective lens to said first focussing lens, in accordance with variations between a pattern of said diffraction rings and a predetermined diffraction pattern.

5. The optical apparatus of claim 4, wherein
   said optical means additionally includes a specular reflection sensor having a single light-sensitive element, and
   said separation means directs said specular reflections to said specular reflection sensor.

6. The optical apparatus of claim 5, additionally including computing means for calculating an inspection function proportional to an output of said first scattered reflection sensor divided by said an output of said specular reflection sensor.

7. The optical apparatus of claim 1, additionally including computing means for calculating an inspection function proportion to a ratio between a difference of outputs of said first and second specular reflection sensors and a sum of outputs of said first and second specular reflection sensors.

* * * * *